US012784403B2

(12) United States Patent
Hui et al.

(10) Patent No.: US 12,784,403 B2
(45) Date of Patent: Nov. 3, 2026

(54) SPECTRAL IMAGE RELATIONSHIP EXTRACTION

(71) Applicant: The Boeing Company, Arlington, VA (US)

(72) Inventors: Leo Ho Chi Hui, Alhambra, CA (US); Haig Francis Krikorian, Fullerton, CA (US)

(73) Assignee: The Boeing Company, Arlington, VA (US)

( * ) Notice: Subject to any disclaimer, the term of this patent is extended or adjusted under 35 U.S.C. 154(b) by 546 days.

(21) Appl. No.: 18/179,501

(22) Filed: Mar. 7, 2023

(65) Prior Publication Data

US 2024/0303964 A1 Sep. 12, 2024

(51) Int. Cl.
*G06V 10/75* (2022.01)
*G06V 10/764* (2022.01)
(Continued)

(52) U.S. Cl.
CPC .......... *G06V 10/751* (2022.01); *G06V 10/765* (2022.01); *G06V 10/95* (2022.01);
(Continued)

(58) Field of Classification Search
CPC ... G06T 7/74; G06T 7/90; G06T 2207/10048; G06T 2207/20076; G06V 10/95; G06V 10/751; G06V 10/765; G06V 20/194
See application file for complete search history.

(56) References Cited

U.S. PATENT DOCUMENTS 8,571,325 B1 * 10/2013 Robinson ............... G06V 20/13 382/103
11,456,059 B2 * 9/2022 Basener .................. G06F 17/18
(Continued)

FOREIGN PATENT DOCUMENTS

CN 103810226 B * 11/2018 ........... G06F 16/583

OTHER PUBLICATIONS

Warren et al. "Hyperspectral Unmixing by the Alternating Direction Method of Multipliers", Inverse Problems and Imaging, vol. 14, No. 3, 2015. Accessed via <https://ww3.math.ucla.edu/camreport/cam14-48.pdf> on Jul. 28, 2025 (Year: 2015).*
(Continued)

*Primary Examiner* — John Villecco
*Assistant Examiner* — Joshua B. Crockett
(74) *Attorney, Agent, or Firm* — Yee & Associates, P.C.

(57) ABSTRACT

Real-time subpixel detection and classification is provided. The method comprises receiving input of a spectral library of targets, a multi-spectral image cube, and a list of background image samples. A candidate ground spatial distance (GSD) cell within the multi-spectral image cube is selected for spectral demixing. The spectrally demixed candidate GSD cell is compared against the spectral library and the list of background image samples. A determination is made whether the candidate GSD cell contains an identifiable target. The candidate GSD cell is labeled unknown if it does not resemble a target in the spectral library nor a sample in the list of potential background image sample. Local global reconciliation is applied to the candidate GSD cell to reject false detections of non-targets and confirm true detection of targets. Detected targets from the candidate GSD cell or an unknown are output in real-time.

20 Claims, 9 Drawing Sheets

(51) Int. Cl.
*G06V 10/94* (2022.01)
*G06V 20/10* (2022.01)
*G06T 7/90* (2017.01)

(52) U.S. Cl.
CPC .............. *G06V 20/194* (2022.01); *G06T 7/90* (2017.01); *G06T 2207/10048* (2013.01); *G06T 2207/20076* (2013.01)

(56) References Cited

U.S. PATENT DOCUMENTS

2010/0329512 A1* 12/2010 Nam ...................... G06V 20/13 382/103
2011/0200225 A1* 8/2011 Kukshya ................ G06V 20/13 382/103
2013/0044963 A1* 2/2013 Robinson ................ G06T 7/194 382/260
2014/0185864 A1* 7/2014 Halper .................. G06V 20/13 382/103
2020/0109990 A1* 4/2020 Campbell ............. G01J 3/0254

OTHER PUBLICATIONS

Loughlin et al. "Efficient Hyperspectral Target Detection and Identification With Large Spectral Libraries" IEEE Journal of Selected Topics in Applied Earth Observations and Remote Sensing, vol. 13, pp. 6019-6028, 2020. Access via <https://ieeexplore.ieee.org/document/9207813?source=IQplus> on Jul. 28, 2025 (Year: 2020).*
Boardman et al. "Analysis of Imaging Spectrometer Data Using N-Dimensional Geometry and a Mixture-Tuned Matched Filtering Approach," IEEE Transactions on Geoscience and Remote Sensing, v. 49, n. 11, p. 4138-4152, Nov. 2011, accessed Feb. 19, 2026 via <https://ieeexplore.ieee.org/document/5985518> (Year: 2011).*
Boyda et al. "Detecting Human Interventions on the Landscape: KAZE Features, Poisson Point Processes, and a Construction Dataset", arXiv.org, publ. Mar. 29, 2017, accessed Jun. 1, 2026 via <https://arxiv.org/abs/1703.10196> (Year: 2017).*

* cited by examiner

SPECTRAL IMAGE RELATIONSHIP EXTRACTION

BACKGROUND INFORMATION

1. Field

The present disclosure relates generally to multi-spectral imaging, and more specifically to target detection at a greatly reduce sub-pixel level.

2. Background

In target detection and classification, the use of hyperspectral data has provided added dimensionality to data discrimination, thereby improving detection and classification performance. Rather than being limited to physical 3-D shapes and volumetric measures, multi-spectral Infra-Red data (i.e., data from selected hyperspectral bands) provide multi-dimensional degrees of freedom for discrimination. The more and finer the spectral bands, the better the spectrum representation fidelity. Visual Near Infra-Red (VNIR) to Long Wave Infra-Red (LWIR) wavelength data are commonly used. Short Wave Infra-Red (SWIR) and Mid Wave Infra-Red (MWIR) are also two in-between bands of interest. In multi-spectral detection, the detection focuses on the target's surface material, which gives a distinctive spectrum as a function of wavelength and material properties.

The detection and classification of targets in a multi-spectral IR image have traditionally used relative target to background thresholding methods after best match determination against a target spectral library. When it comes to detection and classification of subpixel targets in a low spectral contrast environment with the use of a pure 100% fill-fraction target spectral library, however, target and background matching results are no longer cleanly separated, and these methods degrade in performance.

Therefore, it would be desirable to have a method and apparatus that take into account the issues discussed above, as well as other possible issues.

SUMMARY

An illustrative example provides a computer-implemented method of real-time subpixel detection and classification. The method comprises receiving input of a spectral library of targets, a multi-spectral image cube, and a list of background image samples. A candidate ground spatial distance (GSD) cell within the multi-spectral image cube is selected for spectral demixing. The spectrally demixed candidate GSD cell is compared against the spectral library and the list of background image samples. A determination is made whether the candidate GSD cell contains an identifiable target. The candidate GSD cell is labeled unknown if it does not resemble a target in the spectral library nor a sample in the list of potential background image sample. Local global reconciliation is applied to the candidate GSD cell to reject false detections of non-targets and confirm true detection of targets. Detected targets from the candidate GSD cell or an unknown are output in real-time.

Another illustrative embodiment provides a system for real-time subpixel detection and classification. The system comprises a storage device that stores program instructions and one or more processors operably connected to the storage device and configured to execute the program instructions to cause the system to: receive input of a spectral library of targets, a multi-spectral image cube, and a list of background image samples; select a candidate ground spatial distance (GSD) cell within the multi-spectral image cube for spectral demixing; spectrally demix the candidate GSD cell; compare the spectrally demixed candidate GSD cell against the spectral library and the list of background image samples; determine whether the candidate GSD cell contains an identifiable target, wherein the candidate GSD cell is labeled unknown if it does not resemble a target in the spectral library nor a sample in the list of potential background image sample; apply local global reconciliation to the candidate GSD cell to reject false detections of non-targets and confirm true detection of targets; and output, in real-time, detected targets from the candidate GSD cell or an unknown.

Another illustrative embodiment provides a computer program product for real-time subpixel detection and classification. The computer program product comprises a computer-readable storage medium having program instructions embodied thereon to perform the steps of: receiving input of a spectral library of targets, a multi-spectral image cube, and a list of background image samples; selecting a candidate ground spatial distance (GSD) cell within the multi-spectral image cube for spectral demixing; spectrally demixing the candidate GSD cell; comparing the spectrally demixed candidate GSD cell against the spectral library and the list of background image samples; determining whether the candidate GSD cell contains an identifiable target, wherein the candidate GSD cell is labeled unknown if it does not resemble a target in the spectral library nor a sample in the list of potential background image sample; applying local global reconciliation to the candidate GSD cell to reject false detections of non-targets and confirm true detection of targets; and outputting, in real-time, detected targets from the candidate GSD cell or an unknown.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
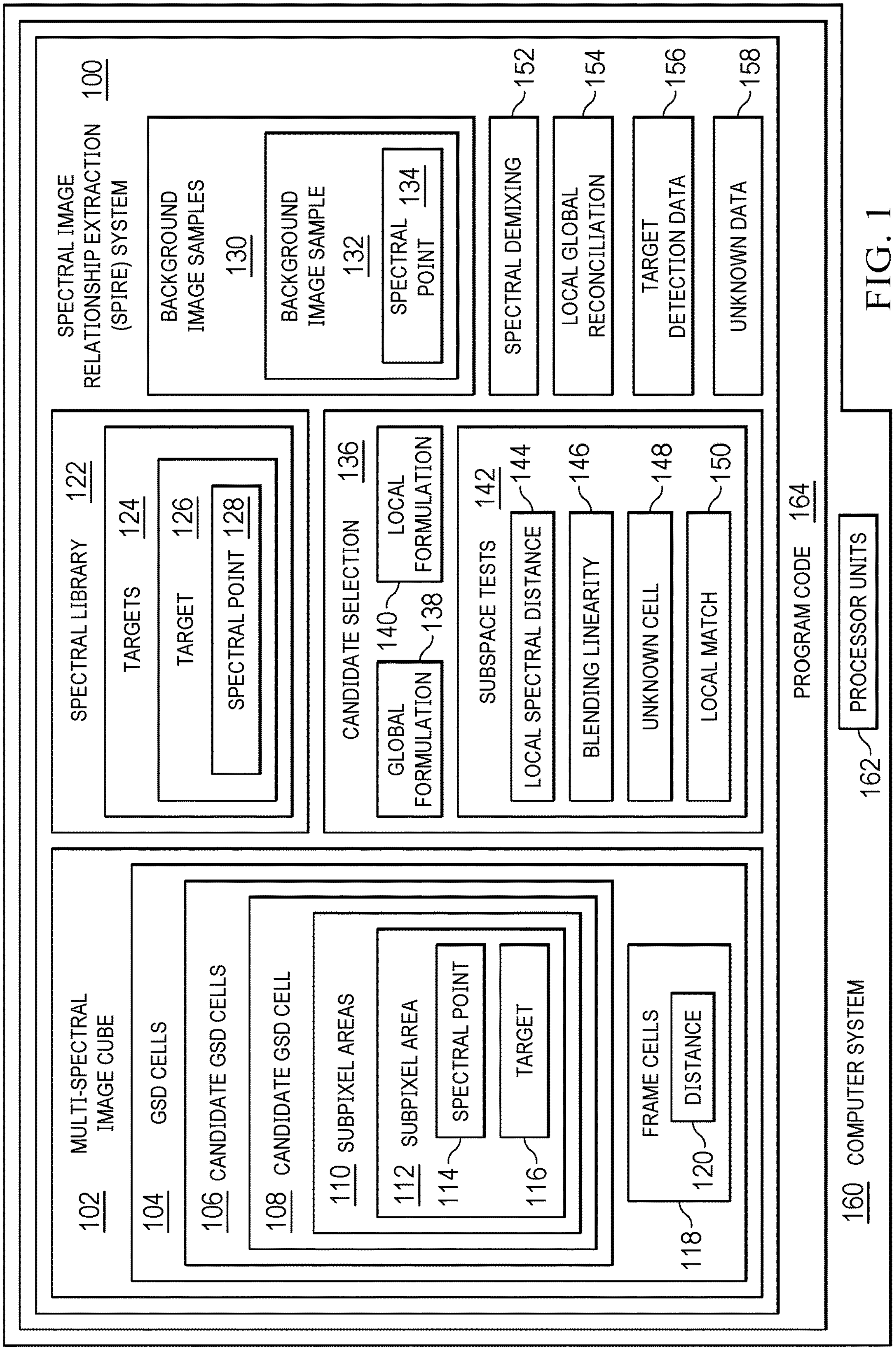
FIG. 1 is an illustration of a block diagram of a spectral image relationship extraction (SPIRE) system in accordance with an illustrative embodiment.

The illustrative embodiments recognize and take into account one or more different considerations as described herein. For example, the illustrative embodiments recognize and take into account that in target detection and classification, the use of hyperspectral data has provided added dimensionality to data discrimination, thereby improving detection and classification performance. Rather than being limited to physical 3-D shapes and volumetric measures, multi-spectral Infra-Red data (i.e., data from selected hyperspectral bands) provide multi-dimensional degrees of freedom for discrimination. The more and finer the spectral bands, the better the spectrum representation fidelity. Visual Near Infra-Red (VNIR) to Long Wave Infra-Red (LWIR) wavelength data are commonly used. Short Wave Infra-Red (SWIR) and Mid Wave Infra-Red (MWIR) are also two in-between bands of interest. In multi-spectral detection, the detection typically focuses on the target's surface material, which gives a distinctive spectrum as a function of wavelength and material properties.

Traditionally, IR sensor technology improvements trend toward providing images of the highest resolution. It uses a multi-spectral detection algorithm to separate targets from their background, followed by a classification algorithm and a spectral library to determine the target's class, type, or identification (ID). As such, common targets of interest usually encompass many resolution pixels of the focal plane array. When a pixel is projected onto the ground, the projection forms the Ground Spatial Distance (GSD) cell. Ground targets can encompass a number of GSD cells.

The multi-spectral target detection algorithm has traditionally used an adaptive subspace detector (ASD) such as adaptive cosine estimator (ACE) or matched filter (MF) that relies on high signal-to-noise ratio (SNR), good target to background Contrast Ratio, and a spectral library. ASDs use a pre-established material spectral library as the reference to match against the image pixel spectra. Normally, the library spectra are based on "pure" (i.e., 100% fill-fraction) material properties since, with high resolution pixels, the pixel spectrum is likely to have a near 100% fill-fraction material spectrum. Proper compensation for atmospheric and environmental effects (such as viewing angle, day/night, sun/shade, clouds, seasonal and/or background content effects) are performed to ensure like-spectral comparisons within the image. Background samples are often gathered to provide a relative contrast comparison. The presence of a set of specific materials in the right abundance implies the presence of a target of interest. Physical shape and size discrimination techniques are often used to further refine target classification.

Recently, the emerging trend is to use simpler, smaller IR imaging sensors. These smaller sensors have the benefits of lower cost, better SWAP (Size, Weight, and Power) characteristics, and faster manufacturing. Their image GSD is typically larger than the targets of interest. A GSD cell may have target material (s) at a small fill-fraction of the GSD and background material (s) for the remainder. The fill-fractions of interest range from 0.1 to 1. Partial target containment from target GSD straddling situations can lead to an even smaller fill-fraction in the GSD cell.

In the large GSD case, the 100% fill-fraction spectral library is reduced from multiple material spectra per target to a single spectrum per target reflecting the average target material spectrum. This leads to having subpixel sized targets and a state-of-the-art challenge to detect and classify subpixel targets using a "pure" spectral library. The library target spectrum is related to a subpixel target spectrum but can no longer be expected to be its optimal match. The detection algorithm has to contend with small fill-fraction targets, variables in atmospheric and environmental content such as clutter variance, and optical image blur effects. Noise is also present that affects detection and classification fidelity. In the past, interest in subpixel detection involved determining boundary edges between two different kinds of terrain, where terrain edges may go across a GSD. Very little literature discusses detecting subpixel targets.

LWIR imagery in particular is most affected by sensor size reduction. LWIR imagery is of interest due to its temperature sensitivity and night vision capability. However, LWIR is the longest IR wavelength band (nearly 10× over VNIR-SWIR) and has the largest optical blur (2× to 3× larger than a pixel) for a given focal length. Therefore, LWIR imagery subpixel target detection is most demanding on detection algorithm performance.

For example, take a scene imaged in VNIR-SWIR and in LWIR bands with a large GSD, and with common targets of interest. Here, LWIR target spectra is much less distinct from background spectra than VNIR-SWIR. On a unity normalized spectral scale, LWIR only has a small frequency band region where target-to-background spectra separation ranges from 0.001 to 0.004. VNIR-SWIR, on the other hand, has almost one-third the frequency band region where target-to-background spectra ranges from 0.15 to 0.4. The much smaller (100× less) LWIR spectra contrast makes target detection more difficult at LWIR than at VNIR-SWIR. A more difficult LWIR target classification problem is also present. The LWIR spectra for targets and background are fairly flat. The max spectral spread across all targets for LWIR is 1% of the maximum radiance. The VNIR-SWIR spectra, on the other hand, are much more varying, and have a max target-to-target spectral spread of 30% of the maximum radiance. The smaller (30× less) LWIR target-to-target spread makes target classification more difficult at LWIR than at VNIR-SWIR.

For subpixel target detection ASDs show good results for small decreases in fill-fraction cases but can significantly degrade at smaller fill-fractions. As expected, their performance is better for VNIR-SWIR images than for LWIR images due to the shorter wavelength/higher contrast benefits. For lower fill-fraction LWIR imagery, these methods show marginal or poor performance since the algorithms' fundamental premise, and the data, are vastly different. With low fill-fraction targets in the presence of clutter variance, there is no longer a clear separation between target and background spectra to cleanly lay a threshold for a detection. Contrast ratio is at a minimum. Within a GSD, the target and background material spectra are blended into a single spectrum. The subpixel target spectrum is no longer well matched to the library target spectrum. Optical blurring further reduces contrast by spectral leakage to neighboring pixels. Since ACE or MF algorithms are not designed for subpixel detection, they have a significantly degraded detection Receiver Operating Characteristic (ROC) performance.

In any multi-spectral detection problem, the detection performance relies on closeness in match between the library target spectrum and the image data spectrum. Regardless of detection algorithm method, any pre-detection efforts to correct for atmospheric effects and remove the optical image blur will improve the image resolution and the contrast between target and background. The improved contrast ratio is directly related to target-to-background spectra separation, and thereby, target detection.

On another perspective, an increase in spectral separation between target and background can also improve detectability. For LWIR, this may be in the form of using spectral emissivity rather than an atmospherically corrected spectrum. Emissivity spectral variations between target and background is more pronounced than that of atmospherically corrected data, thereby aiding improved target detection. The image data is converted to emissivity and compared against a spectral emissivity target library.

The illustrative embodiments provide a new approach, Spectral Image Relationship Extraction (SPIRE), that leverages on the subpixel target to background relationships and uses them to extract targets for detection and classification. Both spectral and spatial relationships are used for the result.

It is in these challenging subpixel detection conditions: large GSD, low fill-fraction (i.e., less than 10% to 50% fill-fraction), and low spectral contrast (e.g., LWIR), that the SPIRE of the illustrative embodiments can perform well using a pure spectral library. SPIRE can also perform well in more lenient (e.g., VNIR-SWIR) detection conditions. SPIRE ROC performance has shown 20% to 50% increase in detections and 50% to 70% decrease in false alarms over ACE.

The illustrative embodiments have the state-of the art features of using local and global pixel relationships, localized background estimation, use of target and background spectral mixture relationships, localized match filtering, sparse reconstruction spectral demixing, spectral decomposition (demixing) based detection and classification decisions, unknown spectrum determination, local to global hit fusion, flexibility to work with different types of spectral data (atmospherically corrected counts, emissivity, or reflectance), and low latency processing design.

SPIRE overcomes the detection difficulties of subpixel target detection down to 0.1 fill-fraction using a 100% fill-fraction target library, subpixel detection and classification in low spectral contrast images, and reduction of false positive detections in high spectrally varying regions.

With reference now to FIG. 1, an illustration a block diagram of a spectral image relationship extraction (SPIRE) system is depicted in accordance with an illustrative embodiment.

SPIRE system 100 operates on a multi-spectral image cube 102, which comprises a number of GSD cells (pixels) 104. Within GSD cells 104 may be a number of candidate GSD cells 106 that possibly contain targets. Each candidate GSD cell 108 comprises a number of subpixel area 110 having respective fill fractions of less than 1. Each subpixel area 112 has a spectral point 114 and may contain a target 116 that is smaller than a full pixel.

Each candidate GSD cell 108 is framed (surrounded) by a number of frame cells 118 from among the other GSD cells 104. Frame cells 120 may be defined by a distance 120 (e.g., one cell, two cells) from the candidate GSD cell of interest.

SPIRE system 100 compares the GSD cells 104 to targets 124 contained in a spectral library 122. Each target 126 in the spectral library 122 has a respective spectral point 128.

SPIRE system 100 also compares the GSD cells 104 to background sample images 130. Each background sample image 132 has a respective spectral point 134.

Candidate selection 136 identifies the candidate GSD cells 106 from among GSD cells 104. Candidate selection 136 employs the processes of global formulation 138, local formulation 140, and subspace tests 142 to identify the candidate GSD cells 106. The subspace tests 142 may comprise local spectral distance 144, blending linearity 146, unknown cell 148, and local match 150.

Spectral Demixing (SD) 152 performs spectral demixing of candidate GSD cells 106 using a sparse reconstruction technique on locally referenced data. Local Global Reconciliation (LGR) 154 is a false alarm reduction stage utilizing local and global spectral and spatial relationships.

After performing candidate selection 136, SD 152, and LGR 154, SPIRE system 100 is able to output target detection data 156 and unknown data 158 in real-time without the need for human intervention. SPIRE system 100 is able to identify subpixel targets in more challenging bands such as long wave infrared (LWIR), where there is less separation from background, as well as easier bands with greater separation.

SPIRE system 100 can be implemented in software, hardware, firmware, or a combination thereof. When software is used, the operations performed by SPIRE system 100 can be implemented in program code configured to run on hardware, such as a processor unit. When firmware is used, the operations performed by SPIRE system 100 can be implemented in program code and data and stored in persistent memory to run on a processor unit. When hardware is employed, the hardware can include circuits that operate to perform the operations in SPIRE system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 160 is a physical hardware system and includes one or more data processing systems. When more than one data processing system is present in computer system 160, those data processing systems are in communication with each other using a communications medium. The communications medium can be a network. The data processing systems can be selected from at least one of a computer, a server computer, a tablet computer, or some other suitable data processing system.

As depicted, computer system 160 includes a number of processor units 162 that are capable of executing program code 164 implementing processes in the illustrative examples. As used herein a processor unit in the number of processor units 162 is a hardware device and is comprised of hardware circuits such as those on an integrated circuit that respond and process instructions and program code that operate a computer. When a number of processor units 162 execute program code 164 for a process, the number of processor units 162 is one or more processor units that can be on the same computer or on different computers. In other words, the process can be distributed between processor units on the same or different computers in a computer system. Further, the number of processor units 162 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
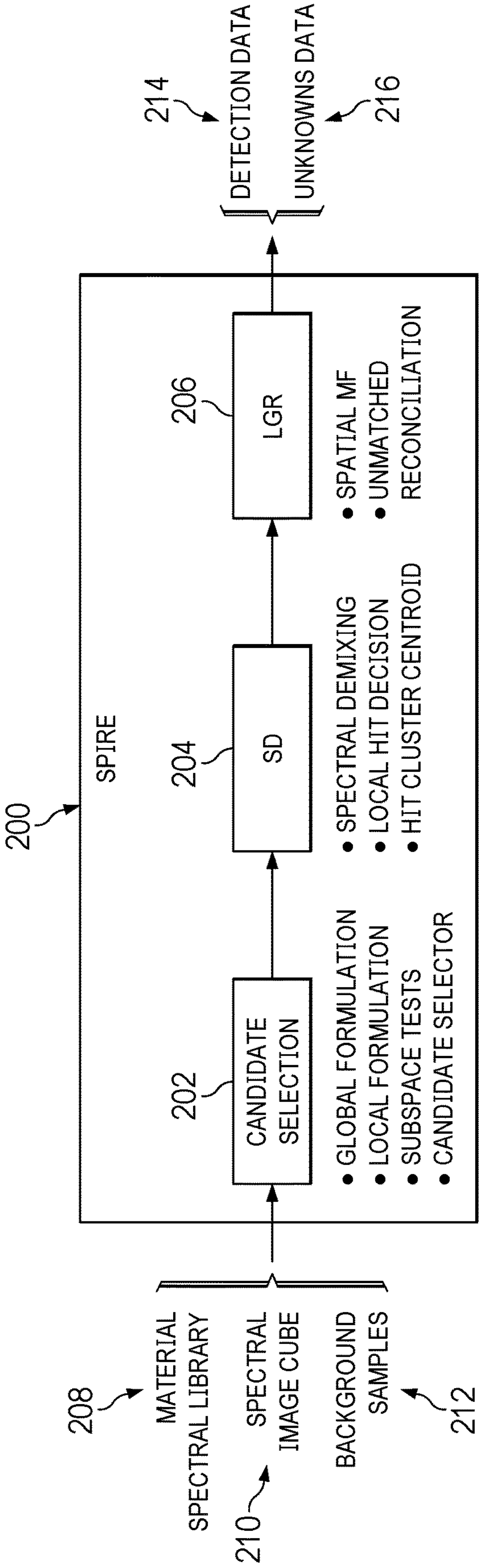
FIG. 2 depicts a diagram illustrating the major processing stages of the SPIRE algorithm in accordance with an illustrative embodiment.

FIG. 2 depicts a diagram illustrating the major processing stages of the SPIRE algorithm in accordance with an illustrative embodiment. SPIRE algorithm 200 may be implemented SPIRE system 100 shown in FIG. 1.

The main elements of SPIRE algorithm 200 comprise candidate selection 202, Spectral Demixing (SD) 204, and local global reconciliation (LGR) 206.

The major inputs to SPIRE algorithm 200 comprise material spectral library 208, multi-spectral image cube 210, and a list of potentially background image samples 212. Candidate selection stage 202 selects candidate GSD cells for spectral demixing, wherein global and local perspectives of target to background relationships are established. Relationship tests are used for candidate selection.

SD stage 204 performs spectral demixing on the candidate cells, compares them against the spectral library, and decides if the cell contains a target, and if so, which target. Any cell that does not resemble the target library spectra, nor background sample spectra, is labeled "unknown," and is saved for future possible targeting consideration.

LGR stage 206 is a false alarm reduction stage utilizing local and global spectral and spatial relationships. The SPIRE algorithm 200 then outputs the detection data 214 and unknowns 216, along with their metadata, which contains the subpixel target spectrum and ID.

In multi-spectral imaging, each spectral component is a degree of freedom in spectral dimensionality. The multi-dimensionality can be expressed in the form of a spectral vector. The end of the vector establishes the spectral point for any spectrum of interest. By using a spectral subspace view, the spectra of the subpixel targets, the target library, and the background samples can be processed with normal vector mathematics and be depicted in graphical form. The detection challenges and the fundamental target to background relationships can be seen more visually.

Figure 3:
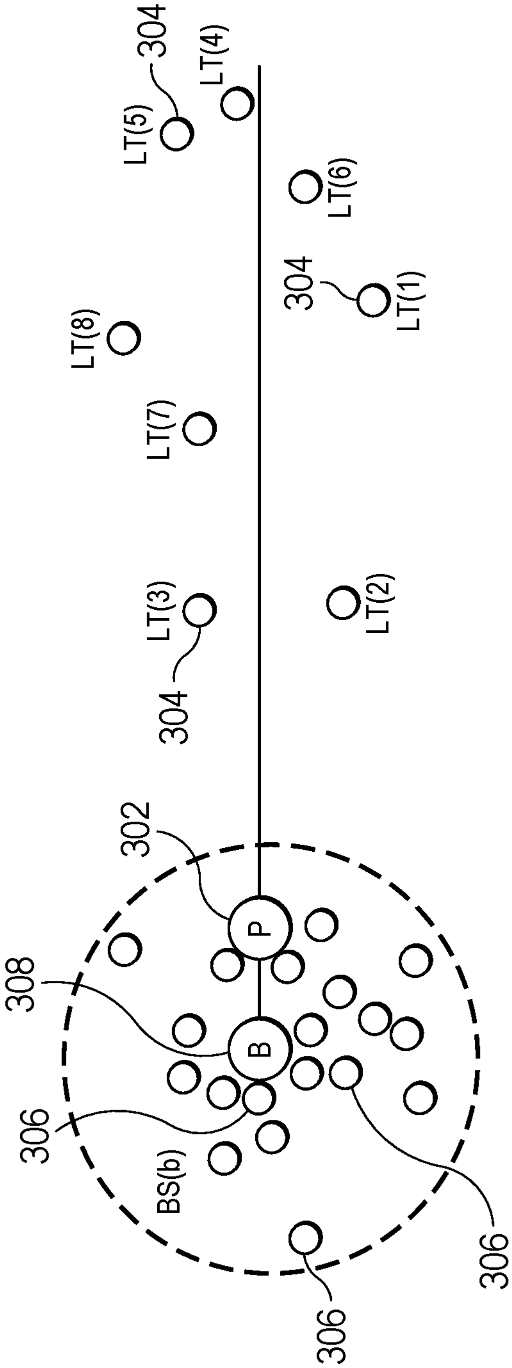
FIG. 3 depicts a diagram illustrating an example spectral subspace view of a GSD cell point in relation to background samples and library target points in accordance with an illustrative embodiment.

FIG. 3 depicts a diagram illustrating an example spectral subspace view of a GSD cell point in relation to background samples and library target points in accordance with an illustrative embodiment.

In the following description notation a scalar parameter N is denoted by N. A column vector P with N elements is denoted by $$\vec{P} = [P_1, P_2, \ldots, P_N]^T,$$

where $[\ ]^T$ denotes the transpose function.

The end point of vector $\vec{P}$ is the point P.

A matrix L of M×N elements is denoted by $$L = \begin{bmatrix} L_{1,1} & L_{1,2} & \ldots & L_{1,N-1} & L_{1,N} \\ L_{2,1} & L_{2,2} & \ldots & L_{2,N-1} & L_{2,N} \\ & & \vdots & & \\ L_{M-1,1} & L_{M-1,2} & \ldots & L_{M-1,N-1} & L_{M-1,N} \\ L_{M,1} & L_{M,2} & \ldots & L_{M,N-1} & L_{M,N} \end{bmatrix}.$$

A matrix containing K number of P column vectors is denoted by $$P = \left[\vec{P}(1)\ \vec{P}(2)\ \ldots\ \vec{P}(K-1)\ \vec{P}(K)\right]$$

A 3D data set S with (row, column, spectral channel level)=(r, c, n) can have row and column indices be referenced by a single index k such that it forms a 2D matrix res of column vectors $\vec{S}(k)$.

Here, for k=(c−1) R+r with k=1, . . . , Nk; r=1, . . . , R; and c=1, . . . , C $$reS = \left[\vec{S}(1)\ \ldots\ \vec{S}(k)\ \ldots\ \vec{S}(Nk-1)\ \vec{S}(Nk)\right],$$

and $$\vec{S}(k) = [S_1, S_2, \ldots, S_N]^T.$$

In FIG. 3 three types of spectral points are depicted: point 302 for GSD cell k (P(k), for k=1, . . . , Nk), points 304 for the 100% fill-fraction targets in the library (LT(j) for j=1, . . . , Nj), and points 306 of the background samples (BS(b), for b=1, . . . , Nb).

Another point is the GSD cell's (i.e. P(k)'s) background spectral point 308 (B(k)). This point is not an input and must be estimated, but it is a key point for subpixel target detection.

With large GSDs, an image GSD cell is typically a blend of many "background" materials, and sometimes it contains a subpixel target. If a GSD cell contains only background, then its spectral point is likely to be close to the background sample points. If the cell contains a target with 100% fill-fraction, then it is likely at one of the library target points. Any cell that has a subpixel target will have a combination of background and 100% fill-fraction target spectral contributions.

The illustrative embodiments use the following linear mixture model to describe the expected spectral vector of a GSD cell k, and hence determine the location of its spectral point in spectral subspace:

$$\vec{P}(k)=a_{j,k}\overrightarrow{LT}(j)+(1-a_{j,k})\vec{B}(k)+\overrightarrow{NS}(k), \quad \text{(Blending Equation, eq. 1)}$$

where $\vec{P}(k)$ is the spectral vector for GSD cell k. This is the spectral image cube cell data after the image has been corrected for atmospheric effects. If LWIR emissivity data is used, $\vec{P}(k)$ would the emissivity spectral vector.

$\overrightarrow{LT}(j)$ is the jth library target spectral vector. $\overrightarrow{LT}(j)$ is the best spectral representation of the pure (i.e. 100% fill-fraction, atmospherically corrected, free of optical blur) target spectrum in the image. If LWIR emissivity data is used, $\overrightarrow{LT}(j)$ would be the target's pure emissivity spectral vector.

$\vec{B}(k)$ is the background spectral vector for GSD cell k. Cell-to-cell clutter type differences, along with clutter statistical variance causes $\vec{B}(k)$ to be different from cell to cell. If LWIR emissivity data is used, $\vec{B}(k)$ would be the background emissivity spectral vector.

$a_{j,k}$ is a scalar representing the fill-fraction of library target j for GSD cell k. $a_{j,k}$ is a fraction between 0 and 1. $a_{j,k}$ is an element of a matrix a. If cell k contains a subpixel library target, $a_{j,k}$ will be non-zero. If cell k contains only background, $a_{j,k}$ will be zero (i.e., $\vec{P}(k)\sim\vec{B}(k)$. If cell k contains only a library target, then a (j,k) equals 1 (i.e. $\vec{P}(k)\sim\overrightarrow{LT}(j)$).

$\overrightarrow{NS}(k)$ denotes the statistical spectral noise vector in the cell.

In the blending equation, $\vec{P}(k)$ and $\overrightarrow{LT}(j)$ are inputs to the detection algorithm, while $a_{j,k}$ and $\vec{B}(k)$ are not known and must be estimated. Typically in high SNR systems, $\overrightarrow{NS}(k)$ is a small contributor to the target background blend, but it does set a lower limit on how well $a_{j,k}$ and $\vec{B}(k)$ can be estimated. We will use images with SNR greater than 30 dB and set the SPIRE subpixel target detection objective for fill-fractions with $a_{j,k}$ above 0.1, thus making $\overrightarrow{NS}(k)$ impact in the Blending equation negligible.

The illustrative embodiments make the assumption that a GSD cell can have in it at most one subpixel target. But even with a one target assumption, it can be seen that equation 1 has an over-determined number of solutions. The ambiguity of what contributes to $\vec{P}(k)$ is apparent. For each library target, a locus of $a_{j,k}$ and $\vec{B}(k)$ combinations can give the same $\vec{P}(k)$ vector.

SPIRE uses the blending relationship to narrow down the possible combinations to find the right one. Note, however, that if $\vec{P}(k)$ and/or $\overrightarrow{LT}(j)$ have representation errors from actual data spectra (e.g., poor atmospheric correction, poor pure spectra modeling, higher noise effects, etc.), then even when the right combination is found it may still not guarantee the correct solution, leading to a miss detection and a higher false alarm. For example, in FIG. 3, if the GSD cell contains LT(4) target, ideally LT(4) should be linear with line segment from B to P if no representation errors exist. However, it may not be since segment B to P depends on how well B is estimated and misrepresentation errors may have shifted and/or rotated all the LT's from their "pure" correct locations.

In subpixel target detection, there are mainly three questions for each image GSD cell: Does this GSD cell contain only background? If not, is the non-background part a target in the target library? If so, which one?

These questions focus on the GSD cell and its content. In this respect, other than using local neighborhood data to estimate the GSD cell background, it is not necessary for subpixel detection to be concerned with parts of the image outside the local neighborhood. On the other hand, if only localized computations are used, the process will miss out on leveraging large data statistical averaging and valuable global target background relationships.

For example, the background samples across the image can be used to establish global background variance statistics and, via a whitening process, reduce the background clutter variance to unity variance for enhancing subpixel target detection. The background samples can also be used to establish a global background mean to re-reference data to enhance sub-clutter visibility of target-to-background spectral relationships.

A global target background view helps to pinpoint spectral outliers (i.e., the cell spectrum is not a match to targets nor common background) as well as finding any large spectral trend areas, such as clouds or large areas of target-like spectral features. This information is also useful to reduce false positive hits. SPIRE uses both local and global relationships to extract the subpixel target GSD cell while minimizing false alarms.

After whitening, a key result is that due to the linear transformation quality of the whitening process, the linear blending relationship still holds except modified by a shift and scaling. The whitened image spectral data and the whitened library data are referenced relative to the global background mean spectrum. In the whitened domain, the Mahalanobis Distance between the origin and any spectral point reflects the contrast ratio between that point and the global mean background.

SPIRE uses these key results in its candidate selection process 202. Selecting candidate GSD cells for spectral demixing, involves the steps of global formulation, local formulation, subspace analysis, and candidate selection.

The first step in global formulation is whitening the image spectral data, the target library data, and the background samples data. A whitening process using the Zero-Phase Component Analysis (ZCA) may be used.

After the whitening calculations, the following computations are performed to update the image, target library, and background samples data.

Denote Pw as the whitening matrix and $\overrightarrow{MXb}$ as the background samples mean spectral vector.

Denote the 3D image data cube as img with elements $img_{r,c,iC}$ with r=1, . . . , Nrow with Nrow as the number of rows in the image, c=1, . . . , Ncol with Ncol as the number of columns in the image, and iC=1, . . . , Nband as the number of spectral bands in the image.

Denote also Reimg as the image cube reshaped into a 2D matrix with elements $Reimg_{k,iC}$ where k=1, . . . , Nk and iC=1, . . . , Nband such that $$\text{Reimg}=\text{reshape}(img,1,Nk),$$

with k=(c−1)Nrow+r and Nk=Nrow*Ncol.

The whitened 2D matrix is given by $$Reimgw = \left[\overrightarrow{Reimgw}(1), \ldots, \overrightarrow{Reimgw}(k), \ldots \overrightarrow{Reimgw}(Nrow * Ncol)\right],$$

where $$\overrightarrow{Reimgw}(k) = Pw\left(\overrightarrow{Reimg}(k) - \overrightarrow{MXb}\right).$$

The normalized whitened 2D matrix is given $$nReimgw = \left[\overrightarrow{nReimgw}(1), \ldots, \overrightarrow{nReimgw}(k), \ldots \overrightarrow{nReimgw}(Nrow * Ncol)\right],$$

where $$\overrightarrow{nReimgw}(k) = \frac{\overrightarrow{Reimgw}(k)}{MDimgw(k)},$$

$MDimgw(k)=\|\overrightarrow{Reimgw}(k)\|$ is the Mahalanobis Distance for GSD cell k, and $\|\overrightarrow{Reimgw}(k)\|$ is the L2-norm of $\overrightarrow{Reimgw}(k)$.

The whitened image data cube is given by $$imgw=\text{reshape}(Reimgw,Nrow,Ncol).$$

Similarly, the normalized image data cube is given by $$nimgw=\text{reshape}(nReimgw,Nrow,Ncol).$$

For the target library data, $\overrightarrow{LT}(j)$ for j=1, . . . , Nj, the whitened target library data are given by $$\overrightarrow{uLT}(j) = Pw\left(\overrightarrow{LT}(j) - \overrightarrow{MXb}\right).$$

The normalized whitened target library data is given by $$\overrightarrow{wLT}(j) = \frac{\overrightarrow{uLT}(j)}{\left\|\overrightarrow{uLT}(j)\right\|}.$$

For the background samples data, BS (b), for b=1, . . . , Nb, the whitened background samples data are given by $$\overrightarrow{uBS}(b) = Pw\left(\overrightarrow{BS}(b) - \overrightarrow{MXb}\right).$$

The normalized whitened background samples data are given by $$\overrightarrow{wBS}(b) = \frac{\overrightarrow{uBS}(b)}{\left\|\overrightarrow{uBS}(b)\right\|}.$$

The global target-to-background matching relationships can then be established. Other global relationship parameters can also be computed.

Let Nk denote the number of GSD cells in the image. Then for k=1, . . . , Nk, the following computations are performed.

Let $\overrightarrow{pt}(k)$ be a 2 element column vector containing the row and column indices of GSD cell k in the image, such that $$\overrightarrow{pt}(k) = \begin{bmatrix} pt_1(k) \\ pt_2(k) \end{bmatrix}.$$

Here k is also the sequential index for the GSD cell in the image and is related to the row and column indices by $$k = (pt_2(k) - 1)\,Nrow + pt_1(k).$$

Let $\overrightarrow{ny}$ be the Nband element normalized whitened image spectral vector for cell m, which is given by $$\overrightarrow{ny} = nimgw_{pt_1(m),pt_2(m),1:Nband}.$$

For the background samples data, compute the ny-to-background samples b matching score value for m by $$DBkgd_b = \overrightarrow{ny}^T\,\overrightarrow{wBk}(b) \text{ for } b = 1, \ldots, Nb.$$

Determine the maximum ny-to-background sample matching values and corresponding sample index by $$[DBkgdmax, IBkgdmax] = \max[DBkgd_1, \ldots DBkgd_b, \ldots DBkgd_{Nb}].$$

Limit DBkgdmax≥0

For the target library data, compute the ny-to-target j matching score value for m by $$Dtgt_j = \overrightarrow{ny}^T\,\overrightarrow{wLT}(j) \text{ for } j = 1, \ldots, Nj.$$

Hence, the ny-to-target matching score vector for cell m is given by $$\overrightarrow{Dtgt} = \left[Dtgt_1, \ldots Dtgt_j, \ldots Dtgt_{Nj}\right].$$

Determine max ny-to-target matching value and corresponding target index by $$[DTgtmax, ITmax] = \max\left[Dtgt_1, \ldots Dtgt_j, \ldots Dtgt_{Nj}\right].$$

A ny-to-target matching enhancement filter is applied to DTgtmax by computing $$LDD = -10\log_{10}(DD),$$

where $$DD = \max\left(1 - DTgtmax^2,\ 1e^{-10}\right).$$

The computations are saved for future use in a Gdat_Save matrix in elements $$\text{Gdat\_Save}_{k,1:7} = \left[\overrightarrow{pt}(m)^T, DTgtmax, ITmax, (DTgtmax - DBkgdmax), DD, LDD\right].$$

When per cell computations for all Npts cells are completed, global cell statistics and thresholds are computed as follows.

The max and standard deviation of LDD for all cells is computed, given by $$\max LDD = \max\left(\text{Gdat\_Save}_{1:Npts,7}\right),$$

$$stdLDD = std\left(\text{Gdat\_Save}_{1:Npts,7}\right),$$

where max is the maximum value function, and std is the standard deviation function.

The log of the median of DD is computed by $$LmedianDD = -10\log_{10}(\text{median}(setdiff(\text{Gdat\_Save}_{1:Nk,6}, 1))),$$

where median is the median value function, and setdiff is the set difference function. setdiff(a,b) outputs elements of a not in b.

The log background matching threshold is computed by $$LBkgdTh = \min(LmedianDD + 1.5\, stdLDD, \max(0.8\, maxLDD, LmedianDD)),$$

where min is the minimum value function.

The LDD threshold is computed by $$LDDDetTh = \min(LmedianDD + \max(0.5\, stdLDD, 10), 0.9\, maxLDD).$$

For the background samples, the mean and standard deviation of their Mahalanobis Distances are given by $$\text{mean\_MDBS} = \text{mean}(MDBS),$$

$$\text{std\_MDBS} = std(MDBS),$$

where MDBS is the 1×Nb matrix of background sample norms, with $$MDBS = [MDBS(1), \ldots MDBS(b), \ldots MDBS(Nb)],$$

$$\text{and } MDBS(b) = \left\|\overrightarrow{uBS}(b)\right\|.$$

A background samples Mahalanobis Distance threshold is established and is given by $$ThMDw = \text{mean\_MDBS} + 3.0\,\text{std\_MDBS}.$$

If a list of cells containing high regional ny-to-target matches are provided as inputs (e.g., cloud cells or large regions of target-like cells), the candidate selection threshold can be increased to update the global statistic with the regional statistical changes. A regional statistical change image is established for later use.

Let ReLmedian_img be an Nrow*Ncol×1matrix, initialized with zeros, that represents the regional median changes Let Highblob_out be an Nrow*Ncol×1 matrix that has non-zero elements for cells that contain large regional ny-to-target matches and zero otherwise. For the non-zero elements, groups of contiguous neighboring cells have the same value starting from 1 and going to NHighblob_out.

Then for each group h with h=1, . . . , NHighblob_out, the following computations are performed.

Determine the absolute reference indices of cells in group k by $$Khout = \text{find}(\text{Highblob\_out} == h).$$

Compute the number of cells in group by

*nKh*=number of elements in Khout.

Set Lmedian_img corresponding to large ny-to-target matching cell groups

```
if nKh > 400
  Nparts = round(nKh/200)
  NumPerPart = floor(nKh/Nparts)
  Denote indK = (1+(Nparts−1) NumPerPart), ... , nKh
  ReLmedian_img(Khout(indK)) = median(Gdat_Save_{Khout(indK),7})
else
  if nKh > 0
    ReLmedian_img(Khout) = median(Gdat_Save_{Khout,7})
  end
end .
```

Next, local formulation determines a local background spectrum estimate for each GSD cell.

Centered about each GSD cell, an outer "frame" of GSD cells is used for the background spectrum estimate. The outer "frame" is spaced either one or two GSD cells about the GSD cell of interest, depending on the GSD size. The spacing is to ensure that the outer "frame" of cells do not contain a part of the target if the target was in the center GSD cell. For a GSD cell with area that normally exceeds 1.5× target area, one GSD spacing may be used. For smaller GSD cell size, a two GSD spacing may be used. This form of local background estimation is used assuming non-closely spaced targets (i.e., targets less than three GSDs apart). The increase in spacing for smaller GSD cell sizes is used to accommodate the increasing target-to-GSD area ratio. For GSDs near the image edge where a full "frame" is not possible, the closest possible "frame" sample is use.

An algorithm to determine the outer "frame" cells for any GSD cell is as follows.

Let (pt1, pt2) be the row and column pair for a GSD cell k in the image.

Let sep be the separation spacing between the GSD cell and the outer "frame" cells. Normally, sep=2. For smaller GSD cell size, then sep=3

Then

```
nOj = 0
for jB = −sep to sep
  for iB = −sep to sep
    IBrtemp = min(max(pt1 + iB,1), Nrow)
    JBrtemp = min(max(pt2 + jB,1), Ncol)
    dIB = IBrtemp−pt1
    dJB = JBrtemp−pt2
    if (IBrtemp~=pt1 or JBrtemp~=pt2) and (iB~=0 or jB~=0)
      if (dIB^2 + dJB^2) > ((sep − 0.5)^2 +
  (min(abs(dIB),abs(dJB)))^2)
          nOj = nOj +1
        IBO(nOj) = IBrtemp
        JBO(nOj) = JBrtemp
      end
    end
  end
end .
```

The row and column pair for outer "frame" cell nOj is given by (IBO(noj), JBO(noj)).

Let the total number of outer "frame" cells for a GSD cell be given by NOj.

The outer "frame" cells' spectral vector in the image is given by $$\overrightarrow{BO}(nOj)=img_{IBO(noj),JBO(noj),iC} \text{ for } iC=1, \ldots \text{ Nband and } nOj=1, \ldots, NOj.$$

The outer "frame" cells' spectral vector in the whitened image is given by $$\overrightarrow{uBO}(nOj)=imgw_{IBO(noj),JBO(nOj),iC} \text{ for } iC=1, \ldots \text{ Nband and } nOj=1, \ldots, NOj.$$

$$\overrightarrow{uBO}(nOj)=imgw_{IBO(noj),JBO(nOj),iC}$$

The outer "frame" cells' spectral vector in the normalized whitened image is given by $$\overrightarrow{wBO}(nOj)=nimgw_{IBO(noj),JBO(nOj),iC} \text{ for } iC=1, \ldots \text{ Nband and } nOj=1, \ldots, NOj.$$

The mean of the spectral data from the outer "frame" cells of each GSD cell is computed as the local background spectrum estimate for that GSD cell.

The mean background spectral vector for GSD cell k in the image is given by $$\overrightarrow{meanimgBLocal}(k) = \frac{1}{NOj}\sum_{nOj=1}^{NOj} \overrightarrow{BO}(nOj).$$

The mean background spectral vector GSD cell k for the whitened image is given by $$\overrightarrow{meanBLocal}(k) = \frac{1}{NOj}\sum_{nOj=1}^{NOj} \overrightarrow{uBO}(nOj)$$

Subspace tests comprises a series of fundamental subpixel target and background relationship tests on each GSD cell k for k=1, . . . , Nk. The tests help to narrow down the number of target to background combinations to eliminate the over-determined solution problem. The test results are used for later determination of subpixel target cells. These relationship tests include Local Spectral Distance test, Blending Linearity test, Unknown cell test, and Local Match test.

Local Spectral Distance (LSD) test compares differences of the mean background spectral point to the GSD cell spectral point and the outer "frame" cell points to look for cells with significant differences. This test determines if the GSD cell is significantly different spectrally from neighboring cells for it to be not a background cell.

Let $\overrightarrow{ylmgw}$ denote the whitened image cube spectral vector for GSD cell k, which is given by $$\overrightarrow{yimgw} = imgw_{pt_1(k),pt_2(k),1:Nband}.$$

The LSD between the GSD cell k spectral point and the mean background spectral point is given by $$normuCMB = \|\overrightarrow{uCMB}\|,$$

where the GSD cell-to-mean background difference spectral vector is given by $$\overrightarrow{uCMB} = \overrightarrow{yimgw} - \overrightarrow{meanBLocal}(k).$$

The LSD between the outer "frame" cell points and the mean background point are given by $$normuCMBO(nOj) = \|\overrightarrow{uCMBO}\| \text{ for } nOj = 1, \ldots, NOj,$$

where the outer "frame" cell-to-mean difference spectral vectors are given by $$\overrightarrow{uCMBO} = \overrightarrow{uBO}(nOj) - \overrightarrow{meanBLocal}(k),$$

where normuCMBO is sorted from low to high values and is denoted as sortnormuCMBO. The mean and standard deviation of the LSD between the outer "frame" cell points and the mean background point are computed by $$\text{Mean\_normuCMBO} = \text{mean}(sortnormuCMBO(2:(NOj-1))$$

$$\text{Sigma\_normuCMBO} = std(sortnormuCMBO(2:(NOj-1)).$$

The LSD threshold is given by $$ThLSD = \text{Mean\_normuCMBO} + fsig\ \text{Sigma\_normuCMBO},$$

where fsig is the LSD threshold scalar, nominally between 1.0 and 2.0 depending on GSD size.

The LSD test result parameter is set as follows:

$$PisCand(k) = \begin{cases} 1 & \text{if } normuCMB \geq ThLSD \\ 0 & \text{otherwise} \end{cases}.$$

Other parameter computed here for later use are as follows:

The magnitude of the LSD differences between the outer “frame” cell points and the mean background point is given by $$sortminusmean(nOj) = \text{abs}(sortnormuCMBO(nOj) - \text{Mean\_normuCMBO})$$

The smallest magnitude LSD difference and the index with the smallest difference is given by $$[Nearestmean, indNearestmean] = \min\,(sortminusmean\,(nOj)\ for\ nOj = 1, \ldots , NOj)$$

The estimate of the outer “frame” background angular deviation is given by $$\text{Bkgdest\_AngErr\_deg} = a\tan(\text{Sigma\_normuCMBO}\,/\,normuCMB) * 180\,/\,pi$$

The Blending Linearity test determines if there are target library spectral points that are within tolerance to a linear blending relationship between the target spectral point, the GSD cell spectral point, and the local mean background spectral point. Ideally, for any cell with a subpixel target that is a member of the target library, the cell point, the cell's background point (i.e., as estimated by using the local mean background), and the library target's spectral point are collinear. In practice, since target library compensations for atmospheric effects and residual blur effects, along with background estimation errors are present, Blending Linearity is achievable only to within a tolerance window. Nevertheless, the Blending Linearity test can further narrow down the GSD cells that contain subpixel targets.

This test uses spectral data of the normal (i.e., unwhitened) image cube. For each GSD cell k that passed the LSD test (i.e., PisCand=1), the cell and its local mean background spectral points are checked against library target spectral points to see if they are within tolerance of a linear blending relationship. If so, a passing test results is established for that cell.

The spectral vector for GSD cell k is given by $$\overrightarrow{M2Cen} = Reimg_{k,iC} \text{ for } iC = 1, \ldots , Nband$$

The GSD cell k minus mean background vector (CMB) spectral vector is given by $$\overrightarrow{CMB} = \overrightarrow{M2Cen} - \overrightarrow{meanimgBLocal}(k)$$

with a norm given by $$normCMB = \|\overrightarrow{CMB}\|,$$

and a unit vector given by $$\overrightarrow{unitCMB} = \frac{\overrightarrow{CMB}}{normCMB}.$$

For each library target j, the following calculations are performed:

The library target j minus GSD cell k (LMC) spectral vector is given by $$\overrightarrow{LMC} = \overrightarrow{LT}(j) - \overrightarrow{M2Cen},$$

with a norm given by $$normCMB = norm(\overrightarrow{LMC}),$$

and a unit vector given by $$\overrightarrow{unitLMC} = \frac{\overrightarrow{LMC}}{normLMC}.$$

The angle between the LMC vector and the CMB vector is given by $$AngleLMCandCMBdeg = a\cos\left(\overrightarrow{unitLMC} \odot \overrightarrow{unitCMB}\right)180/\pi$$

The CMB to LMC cross norm is computed by $$\overrightarrow{CrossnormLMC}(j) = normLMC\ \sin\left(AngleLMCandCMBdeg\pi/180\right).$$

The library target j minus local mean background vector (LMB) is given by $$\overrightarrow{LMB} = \overrightarrow{LT}(j) - \overrightarrow{meanimgBLocal}(k).$$

with a norm given by $$nromLMB = \|\overrightarrow{LMB}\|,$$

and a unit vector given by $$\overrightarrow{unitLMB} = \frac{\overrightarrow{LMB}}{\|\overrightarrow{LMB}\|}.$$

The angle between the library target minus local mean background vector (LMB) and the GSD cell minus mean background vector (CMB) is given by $$AngleLMBandCMBdeg = a\cos(dottemp)180/\pi,$$

with a dot product of LMB and CMB vectors given by $$dottemp = \overrightarrow{unitLMB} \odot \overrightarrow{unitCMB}.$$

A fill-fraction estimate for each target is computed by $$\text{alpha\_j} = \frac{normCMB}{normLMB}\text{sign}(dottemp).$$

A pass to the Blending Linearity Test for a library target j is determined as follows:

```
if (normLMC ≤ alpha_ratio * normCMB ) and (normLMC > 0) and
(AngleLMCandCMBdeg ≥ 0) and (alpha_j > alpha_low) and
(alpha_j ≤ alpha_high), then
  if image is VNIR-SWIR data
    set TisCand(j) = 1 (i.e. Test Passed)
  else
    Compute temp = AngLim + min(Bkgdest_AngErr_deg,5)
    if ( (AngleLMBandCMBdeg ≤ temp) and
       (AngleLMCandCMBdeg ≤ (temp + dAng)) ) or
       (CrossnormvA < Mean_normuCMBO)
         set TisCand(j) = 1 (i.e. Test Passed)
    end
  end
end
```

where

TisCand is the candidate list array. TisCand(j) for j=1, . . . , Nj is initialized to be 0 for each GSD cell prior to the test.

alpha_ratio is the fill-fraction ratio for the minimum desired fill-fraction, alpha min. Here, for alpha min=0.1, alpha_ratio=(1−alpha min)/alpha min=9.

alpha low is the lowest allowable fill-fraction for the Blending Test.

alpha_high is the highest allowable fill-fraction for the Blending Test.

AngLim is the desired AngleLMBandCMBdeg angle limit in degrees. 30 to 70 degrees may be used depending on the GSD size.

dAng is an optional angle limit adjustment in degrees for more tolerance accommodation.

After the blending test for the last library target is performed, the number of library targets that passed the test is denoted as NTisCand. The library targets that passed the test are ranked 1 to NTisCand according to their CMB to LMC cross norms. The lowest CMB to LMC cross norm is ranked 1 and the highest CMB to LMC cross norms is ranked NTisCand. T The top ranked library target index is saved in BestLindex(k). If there are no library targets that passes the test, then BestLindex(k)=0.

For GSD cells that did not pass the Blending Linearity test (i.e. BestLindex(k)≤0), the Unknown Cell (UC) test is performed to determine if the cells are spectrally different from the library targets and background samples, and if so, the cell is denoted as "Unknown."

The UC test is as follows:

Initialize the indicator for Unknown for GSD cell k by Unk(k)=0.

```
if (MDimgw(k) > ThMDw) and ((1 − DT gtmax²) > UnknownTh²)
and (DT gtmax > 0)
  if (maxDDiffTD > 0 ) and (BestLindex(k) = 0)
      Save the cell's spectral vector into a spectral vector array for
Unknown cells denoted by PhiUnknown.
     Save the cell's row and column location into a location array for
Unknown cells denoted by IJUnknown.
     Indicate the cell as containing an Unknown spectrum by setting
Unk(k) = 1
  end
end
```

where

DT gtmax=$Gdat\_Save_{k,3}$ maxDDiffTD=$Gdat\_Save_{k,5}$

UnknownTh is the library target mismatch threshold.

ThMDw is the previously computed background samples Mahalanobis Distance threshold.

The local match (LM) test determined if the best target library spectral match for the GSD cell is significantly separated from local mean background. For GSD cells that are not Unknown (i.e., Unk(k)=0) and have passed the LSD test (i.e., PisCand(k)=1) and the Blending Linearity test (i.e., BestLindex(k)>0), the LM test is performed to test the local matching strength of the library targets and the GSD cell.

A local match filter is used to determine matching strength. The filtered result is then compared against a threshold derived from the average matching strength across the image to determine the test result. The test is passed for GSD cells with filtered matching strength exceeding the threshold.

Let GSD cell k be a cell that passed the LSD and Blending Linearity tests. The local reference point for the test is local mean background spectral point for cell k. The unit vector from the local mean background spectral point to the GSD cell k spectral point is given by $$\overrightarrow{nwCMBmM} = \frac{\left(Pw\,\overrightarrow{CMB}\right)}{\left\|Pw\,\overrightarrow{CMB}\right\|}.$$

For the whitened target library data, the library data for target j is given by $\overrightarrow{uLT}(j)$.

The whitened library target j relative to the local mean background spectral point is given by $$\overrightarrow{uLTmM} = \overrightarrow{uLT}(j) - \overrightarrow{meanBLocal}(k),$$

with a unit vector given by $$\overrightarrow{nluLT}(j) = \frac{\overrightarrow{uLTmM}}{\|\overrightarrow{uLTmM}\|}.$$

The local matching strength of the whitened library target j is given by $$LibdotCMB(j) = \overrightarrow{nwCMBmM} \odot \overrightarrow{nluLT}(j).$$

When LibdotCMB(j) is computed for j=1, . . . , Nj, the library target with the largest matching strength and its index are determined by $$[maxLibdotCMB(k), indmaxLibdotCMB(k)] = \max_{j}(LibdotCMB).$$

The local matching strength is further enhanced by computing $$LDDIter(k) = -10\log_{10}(DDwLib),$$

where $$DDwLib = \max\left(\left(1 - maxLibdotCMB(k)^2\right), 1e^{-10}\right)$$

The LM test is passed if $$LDDIter(k) > \max((\text{ReLmedian\_img}(k) + 0.47\ sigLDD), \text{SF\_LBkgd}\ LBkgdTh),$$

where SF_LBkgd is the background threshold scale factor between 0.5 and 1.0 depending on GSD size.

For a GSD cell that passed the test, the LM test result flag is set to LM(k)=1. For all other GSD cells, LM(k)=0.

Candidate selector 202 checks the results from each of the above tests to determine which GSD cell may contain a subpixel target. For the candidate cells, it determines if further spectral demixing is required to narrow down the candidate group.

For GSD cells that pass the LSD test (i.e., PisCand(k)=1), the Blending Linearity test (i.e., BestLindex(k)>0), the LM test (LM(k)=1), and are not Unknowns (i.e. Unk(k)=0), the SPIRE algorithm performs the SD function. The hit type indicator for GSD cell k, denoted by HitType(k), is set to 1, for the time being. This may change following SD completion.

For all other cells, if the cells are not cells with an unknown spectrum ((i.e. Unk(k)=1), they are declared as background cells, in which case HitType(k) is set to 0.

For cells with an unknown spectrum, Hit Type(k) is set to 2.

SD 204 performs spectral demixing using a sparse reconstruction technique on locally referenced data. It is performed for GSD cells with HitType(k)=1 and with LDDIter(k)<LDDDetTh. LDDDetTh is the upper detection threshold previously computed. If the local matching strength of GSD cell k is strong and at least at the level of LDDDetTh, there is no need for spectral demixing using SD.

For GSD cells that require SD, the SD stage is set up by shifting the whitened cell spectral point, the whitened library target spectral points, and the whitened outer "frame" spectral points to be locally referenced about the whitened local mean background spectral point. Unit vectors are computed for each one.

The local referenced whitened GSD cell k spectral unit vector is given by $$\overrightarrow{nluy} = \frac{\overrightarrow{uCMB}}{normuCMB}.$$

The local referenced whitened library target unit vectors are given by $$\overrightarrow{nluLT}(j) \text{ for } j=1, \ldots, Nj$$

The local referenced whitened outer "frame" unit vectors are given by $$\overrightarrow{nluBO}(nOj) = \frac{\overrightarrow{uCMBO}(nOj)}{normuCMBO(nOj)} \text{ for } nOj = 1, \ldots, NOj.$$

A SD Reference Matrix, nluPhi, is set up for SD input. This reference matrix is a concatenation of the whitened library target unit vectors and the whitened outer "frame" unit vectors given by $$nluPhi = \left[\overrightarrow{nluLT}(j = 1, \ldots, Nj), \overrightarrow{nluBO}(nOj = 1, \ldots, NOj)\right].$$

After setup, SD proceeds to spectral demixing, which may be performed using the Dual Augment Lagrange Multiplier (DALM) technique. The SolveDALM_fast algorithm uses this technique to demixing $\overrightarrow{\text{ylocal}}$ into the simplest linear combination of vectors in the SD Reference Matrix. The routine is called by

[coef,nIter]=SolveDALM_fast(*nluPhi*, $\overrightarrow{nluy}$,'lambda',lambda,'tolerance',tol), where The total number of coefficients is given by Nx1=Nj+NOj. The first Nj coefficients are for library targets, the remaining NOj coefficients are for local background.

coef is a 1 by Nx1 matrix of linear combination coefficients.

nIter is the number of iterations used.

lambda is the Lagrange Multiplier value, set to 0.1.

tol is the desired coefficient tolerance, set to 1e-4.

The coefficients are used to determine the amount of library target and background spectral contributions to the GSD cell k spectrum. Here, the method of weighted vector sum using the coefficients is used to estimate of the resultant library target spectral vector and background spectral vector. An inner product between them and the local cell spectral vector determines their match strengths. Their spectral contributions to the cell spectrum are then determined from their match strength proportions.

The library target contribution is given by $$aTg(k) = \frac{ySumT}{ySumT + ySumBk}.$$

The background contribution is given by $$aBk(k) = \frac{ySumBk}{ySumT + ySumBk},$$

where the match strengths to GSD cell k spectrum for the library target and the background, respectively, is given by $$ySumT = \left(\sum_{j=1}^{Nj} coef_{1,j}\, \overrightarrow{nluLT(j)}\right) \odot \overrightarrow{nluy},$$

-continued and $$ySumBk = \left(\sum_{nOj=1}^{NOj} coef_{1,Nj+nOj}\, \overrightarrow{nluBO}(nOj)\right) \odot \overrightarrow{nluy}.$$

Spectral demixing also checks whether the target coefficients totals are too small for a subpixel target to exist. The sum of the library target coefficients is denoted by smtgt, and sumCoefLL is a coefficient sum lower limit.

If |smtgt|<sumCoefLL, set HitType (k)=0 and aTg(k)=0, aBk(k)=1.

After spectral demixing SD performs a local hit decision. For GSD cells with HitType (k)=1, the following parameters are computed:

```
if LDDIter(k) < LDDDetTh (i.e. the GSD cell requires SD processing),
  The max coefficient value and its index are given by
    [mx, ix] = max(coef_{1,1,...,Nj})
else (i.e. the GSD cell does not require SD processing)
  mx = maxLibdotCMB(k)
  ix = indmaxLibdotCMB(k)
  aTg(k) = 1
  aBk(k) = 0
end
```

The local decision that a subpixel target exists in GSD cell k is given as:

A GSD cell k contains a subpixel target when aTg (k)>aBk (k)

khl is denoted as a 1×Nhl matrix that contains the k indices of GSD cells that carries a local hit where Nhl is the total number of local hits. Then $khl_{1,nhl}$ is the GSD cell index for the nhl'th local hit, with nhl=1, . . . , Nhl.

Then the matrix for row indices and the matrix of column indices of a local hit are given by rhl and chl, respectively. The row element and corresponding column element for hit nhl is computed by $$chl_{1,nhl} = \text{ceil}\left(\frac{khl_{1,nhl}}{Nrow}\right) \quad [00322]$$

and $$rhl_{1,nhl} = khl_{1,nhl} - (chl_{1,nhl} - 1)Nrow.$$

A local hit mask matrix of Nrow by Ncol elements, Lhit, captures the hit results in image format.

$$Lhit_{rhl_{1,nhl},chl_{1,nhl}} = 1$$

for GSD cell $khl_{1,nhl}$ that passed as a subpixel target hit and 0 elsewhere.

Similarly, a target index (Nrow by Ncol) matrix, LhitIT, is set up to capture the hit's target library index.

$$LhitIT_{rhl_{1,nhl},chl_{1,nhl}} = ix$$

for GSD cell $khl_{1,nhl}$ that passed as a subpixel target hit and 0 elsewhere.

When the local hit decisions are complete for all valid cells, an algorithm called Exceedblobber clusters hit cells by taking neighboring local hits within a radius and associating them with a group number. Members of a group are centroided to give a single local hit. A 2D weighted centroid method is used to determine the centroid hit location (in GSD cell units or in any geo-positioning units) and centroid the library target contribution.

The function to group the neighboring local hits is called by

[DetectMap,Nhlc]=ExceedBlobber(Lhit,maxBlobRadius_pix,minPixelsInBlob), where maxBlobRadius_pix is maximum radius factor for VNIR/SWIR and LWIR data, minPixelsInBlob is the minimum number of cells to make a cluster and is set to 1, DetectMap is the output 2D matrix containing the cluster indices of clustered groups in Lhit that satisfy maxBlobRadius_pix and minPixelsInBlob criteria.

Here Nhlc gives the number of clusters formed with nhlc=1, . . . , Nhlc as the indices of the clusters.

Let Nkkhl(nhlc) denote the number of GSD cells in cluster nhlc.

Let nkkhl(nhlc) denote the index of the GSC cells in cluster nhlc, such that nkkhl (nhlc)=1, . . . , Nkkhl(nhlc).

Denote kkhl(nhlc) as a matrix that captures the k indices of GSD cells that are members of cluster nhlc.

Then $kkhl_{1,nkkhl(nhlc)}$ denotes the index of the GSD cell in DetectMap that is a member of cluster nhlc.

For each cluster nhlc, the SD stage finds the row and column indices of GSD cells belonging to cluster nhlc, denoted as ikhl and jkhl, and computes the sequential image cell indices by $$kkhl = (jkhl - 1)Nrow + ikhl.$$

The sum of the hit target contribution of its members is computed by

CumCoef=sum($aTg(kkhl)$).

The weighted centroid of row indices is computed, rounded to the nearest integer, rhlc, and of column indices rounded to nearest integer, chlc, for each cluster, using the target contributions as weights. The 1 by nhlc matrix of centroid row indices for each cluster is denoted rhlc. The 1 by nhlc matrix of centroid column indices for each cluster is denoted chlc.

The weighted centroid sequential image index matrix is computed by $$khlc = (chlc - 1)Nrow + rhlc.$$

If CumCoef>tdet, khlc is captured in a total sequential indices structured list of cluster members kMemb.list(nhlc).

The centroid library target ID is captured in a LChitIT matrix of Nrow by Ncol elements at ($rhlc_{1,nhlc}$,$chlc_{1,nhlc}$).

A local centroid hit mask matrix of Nrow by Ncol elements, LChit, is set up to capture the centroid hit results in image format.

$$Lhit_{rhlc_{1,nhlc},chlc_{1,nhlc}} = 1$$

for a GSD cell that contains a centroid hit and 0 elsewhere.

After SD 204 stage, the SPIRE algorithm 200 applies Local Global Reconciliation (LGR) 206. Often, scene terrain/clutter variations and transitions cause chance spectral changes across GSD cells to have the desired target-to-background spectral characteristics for a hit. Reflectance from clouds, terrain boundary changes, or non-uniform background materials within GSD cells are some example causes. These phenomena can lead to false positive hits. The use of both local and global hits reduce these hits and reduce the final detection false alarm count.

As part of SPIRE processing, both local and global views of the image data are available, which are used to reconcile local and global hits. Spatial filtering is used to fuse hits in a way to reduce the final detection false alarms. This process is accomplished by letting the local centroid hit results (described above) be the primary detection candidates and letting the global hit results either confirm or eliminate a candidate from consideration. A candidate is eliminated from detection when not confirmed by global hits and is spatially far from confirmed results.

For global hits, if $Gdat\_Save_{k,5}>0.0001$ for k=1, . . . , Nk, a global hit in that GSD cell is declared. Nhg denoted the number of global hits and nhg=1, . . . , Nhg are the hit indices.

khg is denoted as a matrix that captures the GSD cell indices that carry a global hit. Then $khg_{1,nhg}$ is the GSD cell index for the nhg'th global hit.

A global hit mask (Nrow by Ncol) matrix, Ghit, is set up to capture the global hits in image format. The row and column indices of a global hit is given by $rhg_{1,nhg}=Gdat\_Save_{khg(nhg),1}$ and $chg_{1,nhg}=Gdat\_Save_{khg(nhg),2}$. Set $Ghit_{rhg_{1,nhg},chg_{1,nhg}}=1$ for GSD cell $khg_{1,nhg}$ and 0 elsewhere.

The spatial match filter finds matching local and global hit locations. Hits in neighboring cells are considered a match as a way to mitigate hit location variability.

The following working parameters sets up the spatial match filter.

A LGR hit mask matrix of Nrow by Ncol elements, LGRMdet, captures the global hits in image format and is initialized to be 0s.

A local match contribution matrix of Nrow by Ncol elements, LF_MdetIT, is set up to capture the target ID of the global hits in image format and is initialized to be 0s.

A left alone matrix of Nhlc by 2 elements, LFAlone, is set up to capture the row and column indices of cells with no direct match and is initialized to be null.

The following fusion of matched hit locations is performed:

For nhlc from 1 to Nhlc,
  Find in khg the cells that has the value of $khlc_{1,nhlc}$ and denote them as det_match
  Set LFScore = 0
  if det_match is not empty,
    Set $LGRMdet_{rhlc_{1,nhlc},chlc_{1,nhlc}} = 1$
  else
    Check the neighboring cells as follows:
    Let rr = [−1 0 1 −1 1 −1 0 1] denote the row offset to the neighboring cells
    Let cc = [−1 −1 −1 0 0 1 1 1] denote the column offset to the neighboring cells
    For iseq from 1 to 8
      if $(rhlc_{1,nhlc} + rr_{1,iseq}) < 1$ or $(chlc_{1,nhlc} + cc_{1,iseq}) < 1$
        or $(rhlc_{1,nhlc} + rr_{1,iseq}) > Nrow$ or $(chlc_{1,nhlc} + cc_{1,iseq}) > Ncol$, Then no need to do anything. Skip to next nhlc else
        if $Ghit_{(rhlc_{1,nhlc}+rr_{1,iseq}),(chlc_{1,nhlc}+cc_{1,iseq})} = 1$
          Set $LGRMdet_{rhlc_{1,nhlc},chlc_{1,nhlc}} = 1$
        end
      end
    end
  end
end For the matched hits locations, $$(\text{i.e. } LGRMdet_{rhlc_{1,nhlc},chlc_{1,nhlc}} = 1),$$

set $$LFMdetIT_{rhlc_{1,nhlc},chlc_{1,nhlc}} = LhitIT_{rhlc_{1,nhlc},chlc_{1,nhlc}},$$

where nAlone is a counter initialized to 0 that keeps track of number of the unmatched local hits. For any unmatched local hit locations, nAlone is incremented and set $LFAlone_{nAlone,1}=rhlc_{1,nhlc}$.

$LFAlone_{nAlone,2}=chlc_{1,nhlc}$.

For unmatched reconciliation, NLFAlone is the total number of unmatched local hits, and nLFAlone is the index to each one such that nLFAlone=1, . . . , NLFAlone.

For those hit locations where there is no corresponding match from the global hits, the following is performed:

Set LFAlone_img = LGRMdet
Set $LF\ Alone\_img_{LFAlone_{nLFAlone,1},LFAlone_{nLFAlone,2}} = 1$
Call the exceedance blobber function (refer to section 7.2) by
[LGRDetectMap, nLGRDetects] = ExceedBlobber(LFAlone_img,NN/GSD,1)
where
  NN is the desired cluster radius. We set NN to 30 for LWIR emissivity data and 80 otherwise.
  GSD is the ground spatial distance of the image (in same units as NN)
Let $Ind = LGRDetectMap_{LFAlone_{nLFAlone,1},LFAlone_{nLFAlone,2}}$
Find cells in LGRDetectMap with the value of Ind and denote them as Dind
Let Nind be the total number of cells in Dind
If (Nind = 1 and FAlone1 $a\_Tg\_img_{LFAlone_{nLFAlone,1},LFAlone_{nLFAlone,2}} > tdet$ ) or
(Nind = 2 and FAlone2 $a\_Tg\_img_{LFAlone_{nLFAlone,1},LFAlone_{nLFAlone,2}} > tdet$ )
or, -continued (Nind = 3 and FAlone3 $a\_Tg\_img_{LFAlone_{nLFAlone,1},LFAlone_{nLFAlone,2}}$ > tdet )
or,
or Nind > 3, then set the following:

$LGRMdet_{LFAlone_{nLFAlone,1},LFAlone_{nLFAlone,2}} = 1$ $LFMdetIT_{LFAlone_{nLFAlone,1},LFAlone_{nLFAlone,2}} = LhitIT_{LFAlone_{nLFAlone,1},LFAlone_{nLFAlone,2}}$' where SFAlone1, SFAlone2, and SFAlone3 are scale factors on appropriate levels to compare against the detection threshold based on the size of the cluster group, Nind.

When the above is completed for all NLFAlone unmatched hits, the SPIRE detection output matrix SPIREdet is LGRMdet. The non-zero cells in SPIREdet are the detection locations. The non-zero cells in LFMdetIT denote the library target ID corresponding to the detection.

The whitening process uses Zero-Phase Component Analysis (ZCA). ZCA has similar steps as whitening using the Principle Component Analysis (PCA) except it maintains the resultant whitened data in the same axes orientation as the input data.

Figure 4:
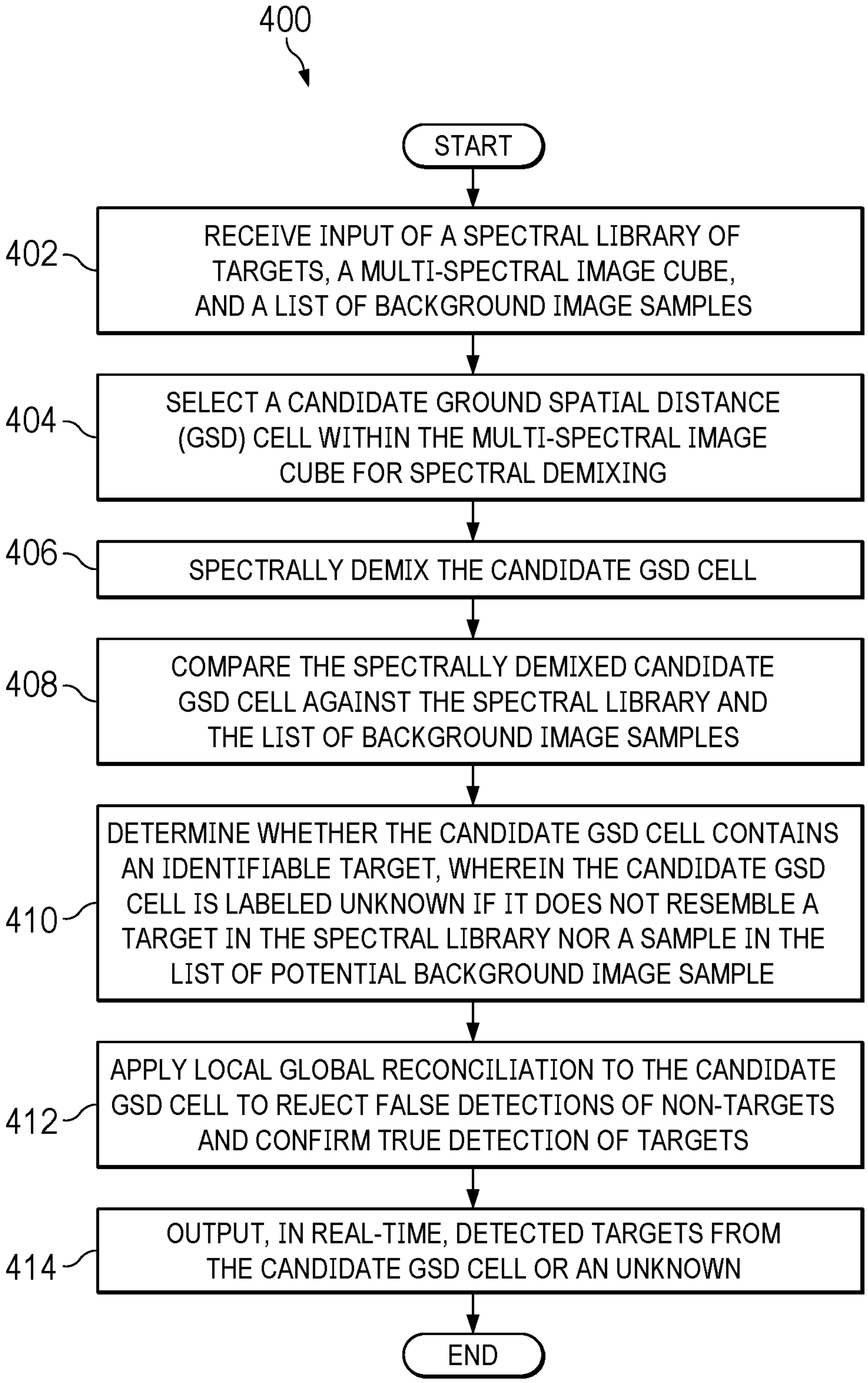
FIG. 4 depicts a flowchart of a process for real-time subpixel detection and classification in accordance with an illustrative embodiment.

FIG. 4 depicts the process for real-time subpixel detection and classification in accordance with an illustrative embodiment. Process 400 can be implemented in hardware, software, or both. When implemented in software, the process can take the form of program code that is run by one of more processor units located in one or more hardware devices in one or more computer systems. For example, the process can be implemented in SPIRE system 100 shown in FIG. 1.

Process 400 begins by receiving input of a spectral library of targets, a multi-spectral image cube, and a list of background image samples (operation 402). The spectral library of targets might comprise any type of spectral library including, e.g., pure material spectra, spectra from a blend of materials, spectra from entire objects, atmospherically corrected spectra, and emissivity.

The multi-spectral image cube might include subpixel size targets and/or multi-pixel sized targets. The multi-spectral image cube might include at least one of Visual Near Infra-Red (VNIR) data, Short Wave Infra-Red (SWIR) data, Mid Wave Infra-Red (MWIR) data and/or Long Wave Infra-Red (LWIR) data. The multi-spectral image cube might also comprise atmospherically corrected data and emissivity data.

The multi-spectral image cube might be from a low contrast environment. Prior methods for target detection typically require a minimum SNR of 4 dB to 6 dB for detection. For SPIRE and subpixel detection in process 400, the low contrast environment might be near or below 1 dB.

A candidate ground spatial distance (GSD) cell is selected within the multi-spectral image cube for spectral demixing (operation 404). The candidate GSD cell can have a fill fraction of 10% to 100%.

The candidate GSD cell is then demixed (operation 406). Spectrally demixing the candidate GSD cell may be performed according to the Dual Augment Lagrange Multiplier technique.

The spectrally demixed candidate GSD cell is compared against the spectral library and the list of background image samples (operation 408). Comparing the spectrally demixed candidate GSD cell against the spectral library and the list of background image samples might comprise determining an amount of spectral contribution made to the candidate GSD cell by background and library targets.

A determination is made whether the candidate GSD cell contains an identifiable target (operation 410). The candidate GSD cell is labeled unknown if it does not resemble a target in the spectral library nor a sample in the list of potential background image sample.

Local global reconciliation is applied to the candidate GSD cell to reject false detections of non-targets and confirm true detection of targets (operation 412).

Detected targets from the candidate GSD cell or an unknown are output in real-time (operation 414). Process 400 then ends.

Figure 5:
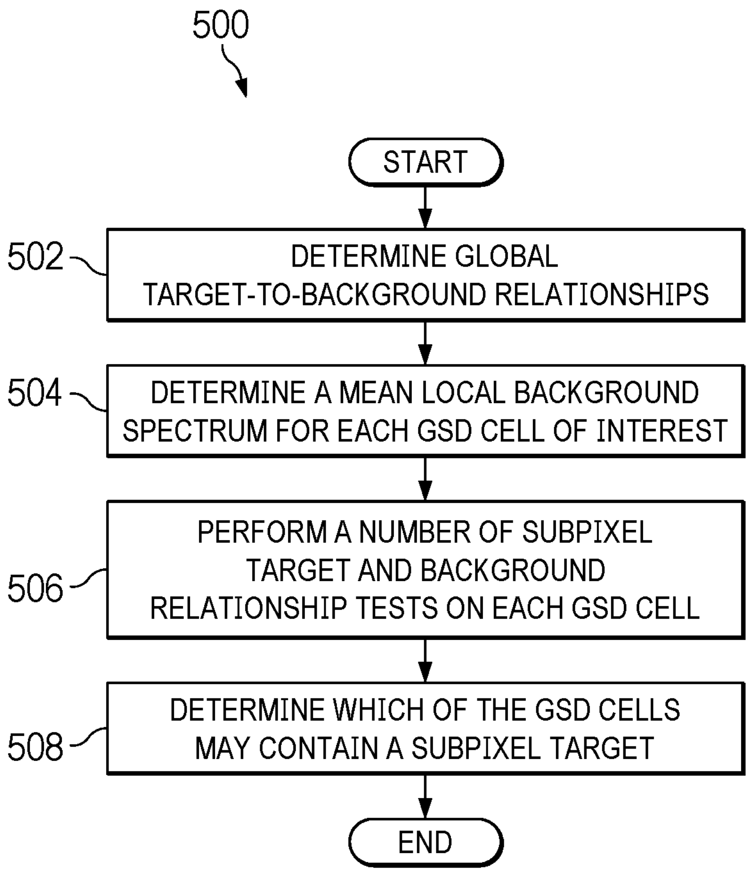
FIG. 5 depicts a flowchart illustrating a process for selecting the candidate GSD cell in accordance with an illustrative embodiment.

FIG. 5 depicts a flowchart illustrating a process for selecting the candidate GSD cell in accordance with an illustrative embodiment. Process 500 is a detailed example of operation 404 in FIG. 4.

Process 500 begins by determining global target-to-background relationships (operation 502). A mean local background spectrum is determined for each GSD cell of interest (operation 504).

A number of subpixel target and background relationship tests are performed on each GSD cell (operation 506), and a determination is made regarding which of the GSD cells may contain a subpixel target (operation 508).

Figure 6:
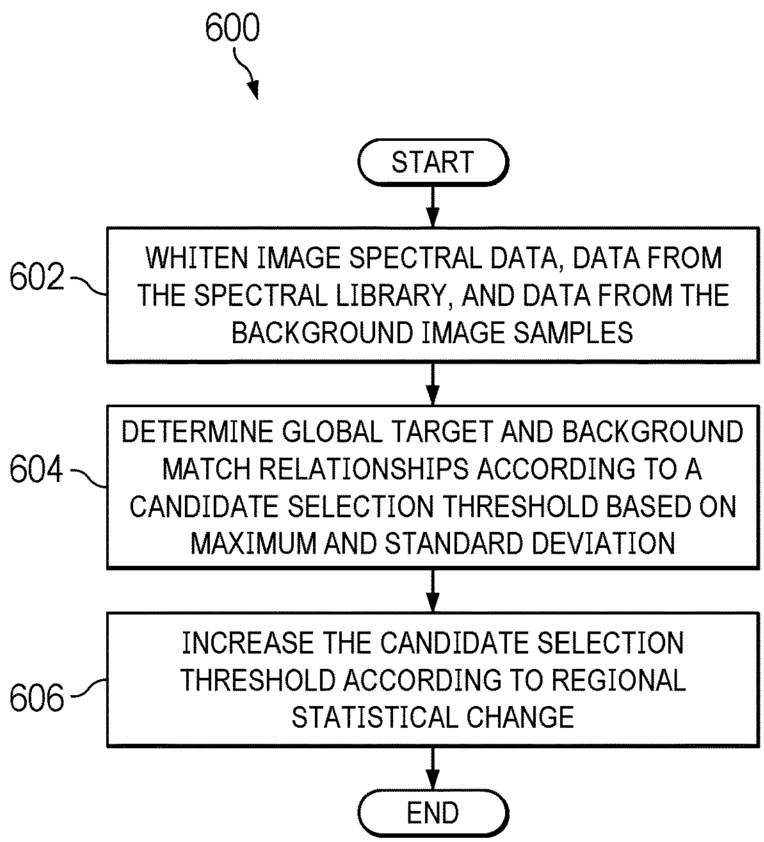
FIG. 6 depicts a flowchart illustrating a process for determining global target-to-background relationships in accordance with an illustrative embodiment.

FIG. 6 depicts a flowchart illustrating a process for determining global target-to-background relationships in accordance with an illustrative embodiment. Process 600 is a detailed example of operation 502 in FIG. 5.

Process 600 begins by whitening image spectral data, data from the spectral library, and data from the background image samples (operation 602).

Global target and background match relationships are determined according to a candidate selection threshold based on maximum and standard deviation (operation 604).

Optionally, the candidate selection threshold may be increased according to regional statistical change (operation 606). Process 600 then ends.

Figure 7:
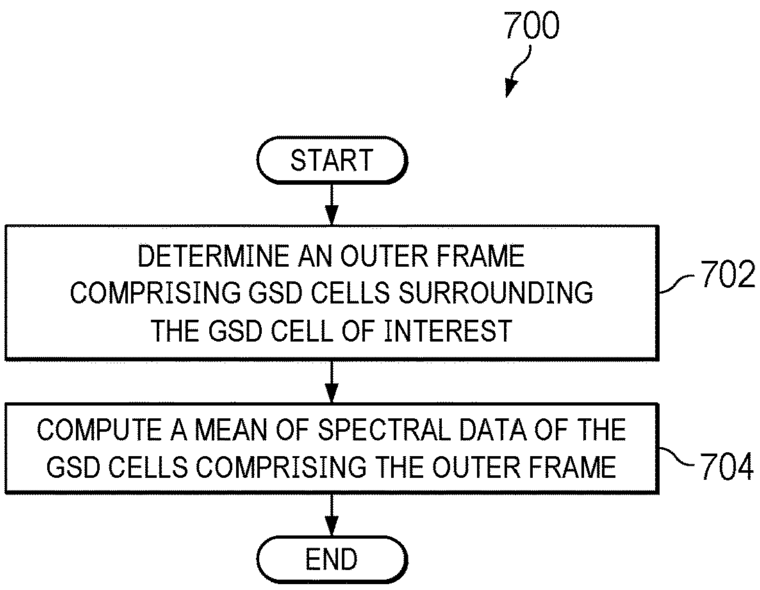
FIG. 7 depicts a flowchart illustrating a process for determining the mean local background spectrum for each GSD cell of interest in accordance with an illustrative embodiment.

FIG. 7 depicts a flowchart illustrating a process for determining the mean local background spectrum for each GSD cell of interest in accordance with an illustrative embodiment. Process 700 is a detailed example of operation 504 in FIG. 5.

Process 700 begins by determining an outer frame comprising GSD cells surrounding the GSD cell of interest (operation 702).

A mean is then computed of spectral data of the GSD cells comprising the outer frame (operation 704). Process 700 then end.

Figure 8:
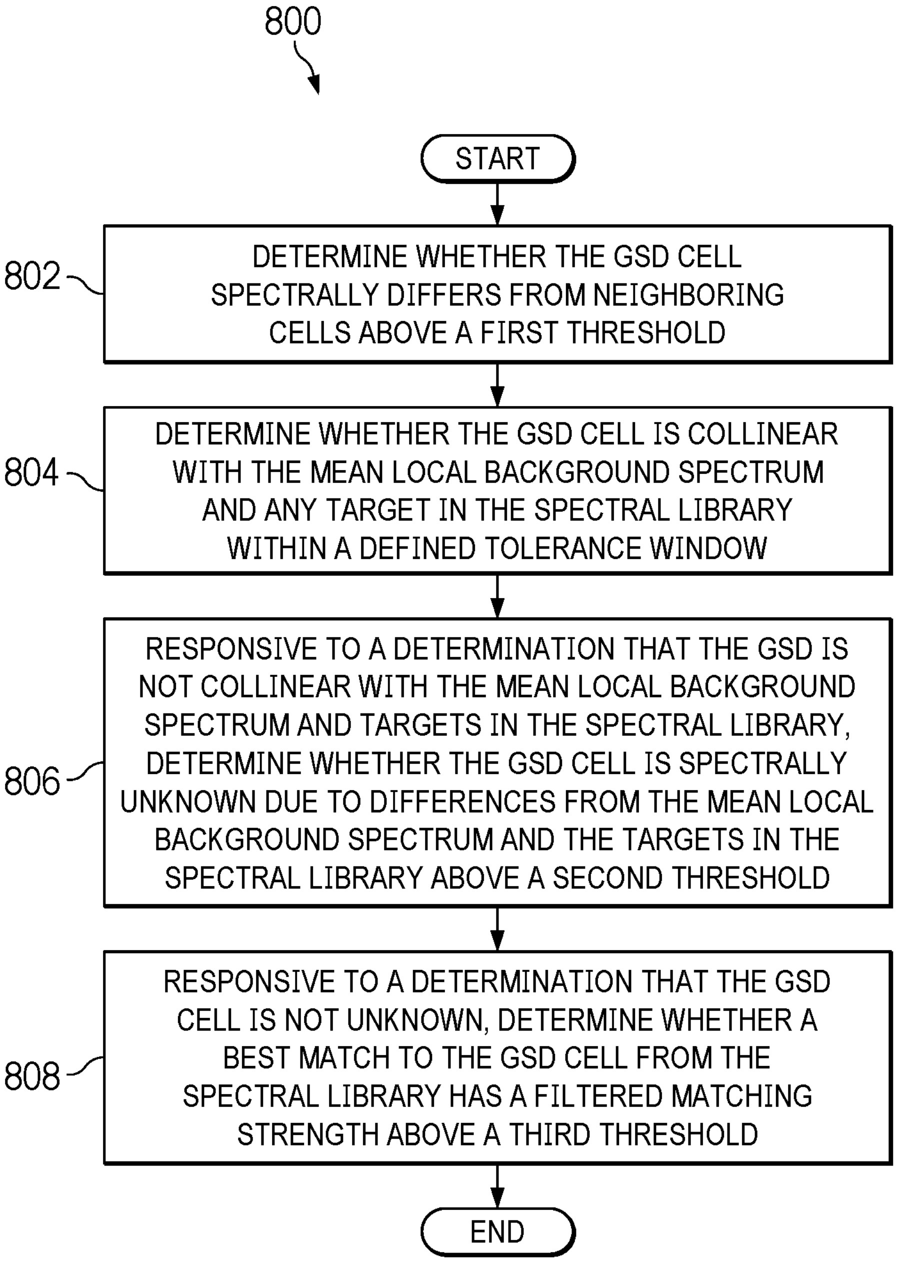
FIG. 8 depicts a flowchart illustrating subpixel target and background relationship tests in accordance with an illustrative embodiment.

FIG. 8 depicts a flowchart illustrating subpixel target and background relationship tests in accordance with an illustrative embodiment. Process 800 is a detailed example of operation 506 in FIG. 5.

Process 800 begins with a local spectral distance test to determine whether the GSD cell spectrally differs from neighboring cells above a first threshold (operation 802).

A blending linearity test determines whether the GSD cell is collinear with the mean local background spectrum and any target in the spectral library within a defined tolerance window (operation 804).

Responsive to a determination that the GSD is not collinear with the mean local background spectrum and targets in the spectral library, an unknown cell test determines whether the GSD cell is spectrally unknown due to differences from the mean local background spectrum and the targets in the spectral library above a second threshold (operation 806).

Responsive to a determination that the GSD cell is not unknown, a local match test determines whether a best match to the GSD cell from the spectral library has a filtered matching strength above a third threshold (operation 808). Process 800 then ends.

Figure 9:
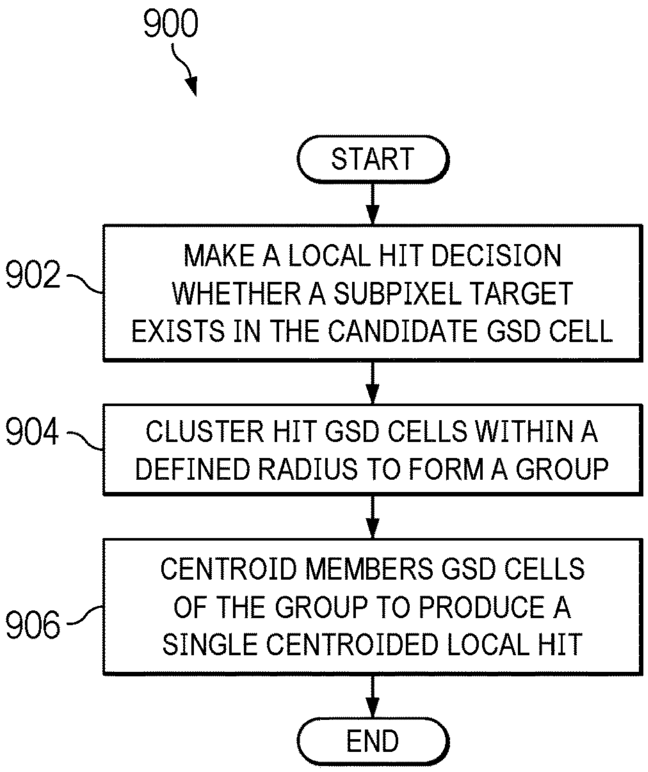
FIG. 9 depicts a flowchart illustrating a process for determining whether the candidate GSD cell contains an identifiable target in accordance with an illustrative embodiment.

FIG. 9 depicts a flowchart illustrating a process for determining whether the candidate GSD cell contains an identifiable target in accordance with an illustrative embodiment. Process 900 is a detailed example of operation 410 in FIG. 4.

Process 900 begins by making a local hit decision whether a subpixel target exists in the candidate GSD cell (operation 902).

Hit GSD cells within a defined radius are clustered to form a group (operation 904).

Members GSD cells of the group are then centroided to produce a single centroided local hit (operation 906). Process 900 then ends.

Figure 10:
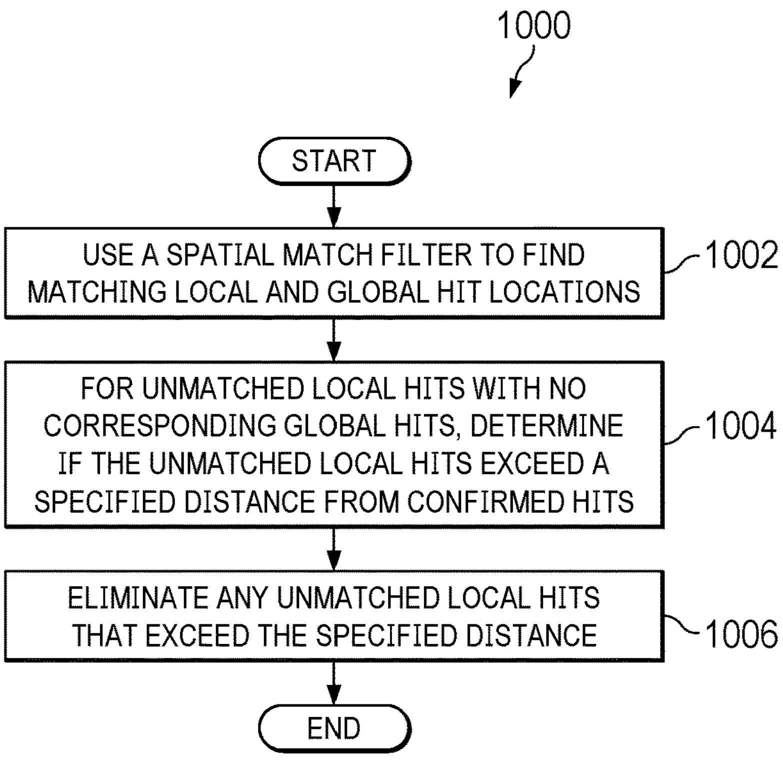
FIG. 10 depicts a flowchart illustrating a process for applying local global reconciliation in accordance with an illustrative embodiment.

FIG. 10 depicts a flowchart illustrating a process for applying local global reconciliation in accordance with an illustrative embodiment. Process 1000 is a detailed example of operation 410 in FIG. 4.

Process 1000 begins by using a spatial match filter to find matching local and global hit locations (operation 1002).

For unmatched local hits with no corresponding global hits, a determination is made if the unmatched local hits exceed a specified distance from confirmed hits (operation 1004).

Any unmatched local hits that exceed the specified distance are eliminated (operation 1006). Process 1000 then ends.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
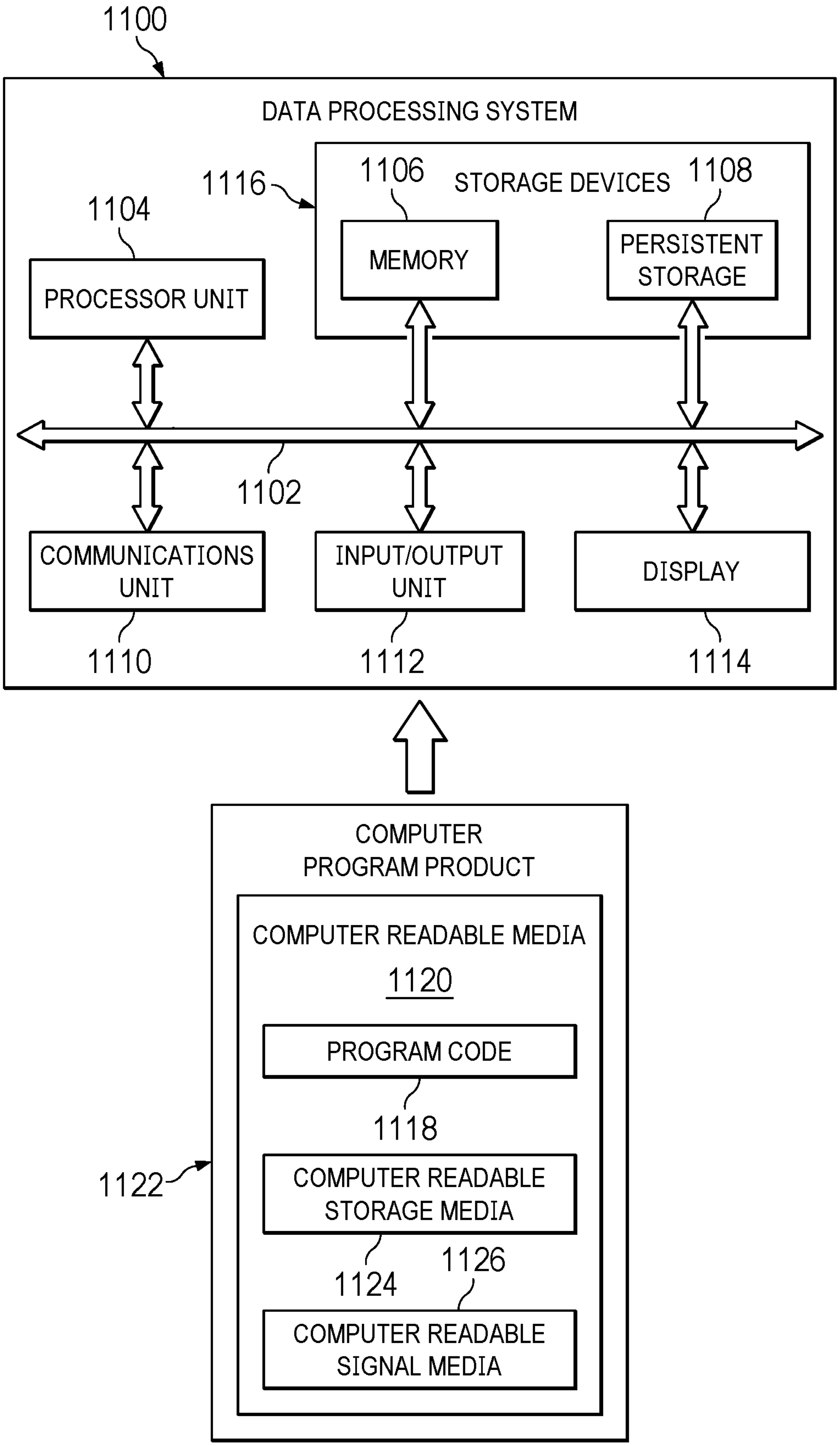
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 160 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (GPUS).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of real-time subpixel detection and classification, the method comprising:

using a number of processors to perform the operations of:

receiving input of a spectral library of targets, a multi-spectral image cube, and a list of background image samples;

selecting a candidate ground spatial distance (GSD) cell within the multi-spectral image cube for spectral demixing;

spectrally demixing the candidate GSD cell;

comparing the spectrally demixed candidate GSD cell against the spectral library of targets and the list of background image samples;

determining whether the candidate GSD cell contains an identifiable target, wherein the candidate GSD cell is labeled unknown if it does not resemble the target in the spectral library of targets nor a sample in the list of background image samples;

applying local global reconciliation to the candidate GSD cell to reject false detections of non-targets and confirm true detection of targets, wherein applying local global reconciliation comprises:

using a spatial match filter to find matching local and global hit locations;

for unmatched local hits with no corresponding global hits, determining if the unmatched local hits exceed a specified distance from confirmed hits; and eliminating any unmatched local hits that exceed the specified distance; and outputting, in real-time, detected targets from the candidate GSD cell or an unknown.

2. The method of claim 1, wherein selecting the candidate GSD cell within the multi-spectral image cube comprises:

determining global target-to-background relationships;

determining a mean local background spectrum for each GSD cell of interest;

performing a number of subpixel target and background relationship tests on each GSD cell; and determining which of the GSD cells may contain a subpixel target.

3. The method of claim 2, wherein determining global target-to-background relationships comprises:

whitening image spectral data from the multi-spectral image cube, data from the spectral library, and data from the background image samples; and determining global target and background match relationships according to a candidate selection threshold based on maximum and standard deviation.

4. The method of claim 3, further comprising increasing the candidate selection threshold according to regional statistical change.

5. The method of claim 2, wherein determining the mean local background spectrum for each GSD cell of interest comprises:

determining an outer frame comprising GSD cells surrounding the GSD cell of interest; and computing a mean of spectral data of the GSD cells comprising the outer frame.

6. The method of claim 2, wherein the subpixel target and background relationship tests comprise:

determining whether a GSD cell spectrally differs from neighboring cells above a first threshold;

determining whether the GSD cell is collinear with the mean local background spectrum and any target in the spectral library within a defined tolerance window;

responsive to a determination that the GSD is not collinear with the mean local background spectrum and targets in the spectral library, determining whether the GSD cell is spectrally unknown due to differences from the mean local background spectrum and the targets in the spectral library above a second threshold; and responsive to a determination that the GSD cell is not unknown, determining whether a best match to the GSD cell from the spectral library has a filtered matching strength above a third threshold.

7. The method of claim 1, wherein spectrally demixing the candidate GSD cell is performed according to the Dual Augment Lagrange Multiplier technique.

8. The method of claim 1, wherein comparing the spectrally demixed candidate GSD cell against the spectral library and the list of background image samples comprises determining an amount of spectral contribution made to the candidate GSD cell by background and library targets.

9. The method of claim 1, wherein determining whether the candidate GSD cell contains an identifiable target comprises:

making a local hit decision whether a subpixel target exists in the candidate GSD cell;

clustering hit GSD cells within a defined radius to form a group; and centroiding members GSD cells of the group to produce a single centroided local hit.

10. The method of claim 1, wherein selecting a candidate ground spatial distance (GSD) cell within the multi-spectral image cube for spectral demixing comprises:

employing local formulation and subspace tests, wherein the candidate GSD cell is formed when a single pixel is projected onto a ground and when the GSD comprises a distance between the single pixel projected on the ground and an adjacent pixel projected on the ground and wherein the candidate GSD cell corresponds to the single pixel projected on the ground, wherein a target of the spectral library of targets is a fraction in a range of 0.1 to 0.5 of the candidate GSD cell, and wherein the GSD cell comprises a plurality of objects on the ground.

11. The method of claim 1, wherein the spectral library of targets comprises at least one of spectra from a blend of materials, atmospherically corrected spectra, or emissivity.

12. The method of claim 1, wherein the multi-spectral image cube includes subpixel size targets.

13. The method of claim 1, wherein the multi-spectral image cube includes multi-pixel sized targets.

14. The method of claim 1, wherein the multi-spectral image cube includes at least one of:

visual near infra-red (VNIR) data;

short wave infra-red (SWIR) data;

mid wave infra-red (MWIR) data; or long wave infra-red (LWIR) data.

15. The method of claim 1, wherein the multi-spectral image cube comprises atmospherically corrected data.

16. The method of claim 1, wherein the multi-spectral image cube comprises emissivity data.

17. The method of claim 1, wherein the multi-spectral image cube is from a low contrast environment.

18. The method of claim 1, wherein the spectral library of targets comprises any type of spectra.

19. A system for real-time subpixel detection and classification, the system comprising:

a storage device that stores program instructions;

one or more processors operably connected to the storage device and configured to execute the program instructions to cause the system to:

receive input of a spectral library of targets, a multi-spectral image cube, and a list of background image samples;

select a candidate ground spatial distance (GSD) cell within the multi-spectral image cube for spectral demixing;

spectrally demix the candidate GSD cell;

compare the spectrally demixed candidate GSD cell against the spectral library of targets and the list of background image samples;

determine whether the candidate GSD cell contains an identifiable target, wherein the candidate GSD cell is labeled unknown if it does not resemble the target in the spectral library of targets nor a sample in the list of background image samples;

apply local global reconciliation to the candidate GSD cell to reject false detections of non-targets and confirm true detection of targets, wherein the program instructions further cause the system to use a spatial match filter to find matching local and global hit locations;

for unmatched local hits with no corresponding global hits, determine if the unmatched local hits exceed a specified distance from confirmed hits; and eliminate any unmatched local hits that exceed the specified distance; and output, in real-time, detected targets from the candidate GSD cell or an unknown.

20. A computer program product for real-time subpixel detection and classification, the computer program product comprising:

a non-transitory computer-readable storage medium having program instructions embodied thereon to perform the steps of:

receiving input of a spectral library of targets, a multi-spectral image cube, and a list of background image samples;

selecting a candidate ground spatial distance (GSD) cell within the multi-spectral image cube for spectral demixing;

spectrally demixing the candidate GSD cell;

comparing the spectrally demixed candidate GSD cell against the spectral library of targets and the list of background image samples;

determining whether the candidate GSD cell contains an identifiable target, wherein the candidate GSD cell is labeled unknown if it does not resemble the target in the spectral library of targets nor a sample in the list of background image samples;

applying local global reconciliation to the candidate GSD cell to reject false detections of non-targets and confirm true detection of targets, wherein applying local global reconciliation comprises:

using a spatial match filter to find matching local and global hit locations;

for unmatched local hits with no corresponding global hits, determining if the unmatched local hits exceed a specified distance from confirmed hits; and eliminating any unmatched local hits that exceed the specified distance; and outputting, in real-time, detected targets from the candidate GSD cell or an unknown.

* * * * *